US006937931B2

(12) United States Patent
Funato et al.

(10) Patent No.: US 6,937,931 B2
(45) Date of Patent: Aug. 30, 2005

(54) VEHICLE CONTROL SYSTEM

(75) Inventors: Masahiro Funato, Hirakata (JP); Toshikazu Okada, Osaka (JP); Shigeru Yamamoto, Hirakata (JP); Tomohiro Nakagawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/946,516

(22) Filed: Sep. 21, 2004

(65) Prior Publication Data

US 2005/0071068 A1 Mar. 31, 2005

(30) Foreign Application Priority Data

Sep. 26, 2003 (JP) .......................................... 2003-335930
Sep. 2, 2004 (JP) .......................................... 2004-255835

(51) Int. Cl.[7] .............................................. B60K 41/18
(52) U.S. Cl. ................................ 701/54; 701/53; 60/445
(58) Field of Search .............................. 701/1, 51, 53, 701/54, 55, 56, 60, 61, 100; 477/34, 120, 128; 60/421, 428, 445

(56) References Cited

U.S. PATENT DOCUMENTS

| 4,082,013 A | 4/1978 | Dornfeld et al. |
| 4,309,917 A | 1/1982 | Leet |
| 4,497,223 A | 2/1985 | Maruyama et al. |
| 4,637,275 A | 1/1987 | Whalen |
| 5,682,315 A * | 10/1997 | Coutant et al. ................ 701/57 |
| 6,424,902 B1 * | 7/2002 | Kuras .......................... 701/51 |

FOREIGN PATENT DOCUMENTS

JP  62-31660 B2  7/1987

OTHER PUBLICATIONS

*RELATED* U.S. Appl. No. 10/979,922, filed Nov. 1, 2004; Title: Vehicle Control System; Inventors: Masahiro Funato et al.

* cited by examiner

*Primary Examiner*—Richard M. Camby
(74) *Attorney, Agent, or Firm*—Frishauf, Holtz, Goodman & Chick, P.C.

(57) ABSTRACT

A vehicle control system having an engine and a hydromechanical transmission, which further comprises a decelerator for changing target engine speed according to the operating amount of a decelerator pedal; a hydrostatic transmission unit controlling means for controlling a hydrostatic transmission unit so as to make the actual speed of the engine coincident with the target engine speed; and engine controlling means for controlling the engine such that if the target engine speed is changed from a first target value to a second target value lower than the first target value by the decelerator, the output torque of the engine is reduced, while keeping the ratio of the amount of change in the output torque of the engine to the amount of change in the target engine speed constant or substantially constant.

8 Claims, 17 Drawing Sheets

3 (a)

3 (b)

3 (c)

15 (a)

15 (b)

16 (a)

16 (b)

17 (a)

17 (b)

— 1 —
VEHICLE CONTROL SYSTEM

TECHNICAL FIELD

The present invention relates to a vehicle control system adapted for use in a work vehicle such as a bulldozer.

BACKGROUND ART

There have been known vehicle control systems having an engine and a hydro-mechanical transmission (HMT) which transmits engine power from an input shaft to an output shaft through a mechanical transmission unit and a hydrostatic transmission unit (e.g., Japanese Patent Kokoku Publication No. 62-31660). Since mechanical power can be transmitted with high efficiency, the transmission (HMT) provided for this control system is designed to convert only part of mechanical power into hydraulic power, so that it can achieve high transmission efficiency. Such a transmission is considered to be an ideal transmission for vehicles subjected to wide load variations such as bulldozers and wheel loaders and is, in fact, employed in some vehicles.

In a typical hydro-mechanical transmission (HMT), variable speed characteristics are achieved by a planetary gear train. More concretely, the transmission is arranged as follows. Of three elements of the planetary gear train (i.e., the sun gear, the carrier provided with planetary gears, and the ring gear), a first element is coupled to the input shaft, a second element is coupled to the output shaft, and a third element is coupled to a hydraulic pump or hydraulic motor. The rotational speed of the hydraulic pump or hydraulic motor is varied thereby changing the rotational speed of the output shaft.

In the known art, there are basically two types of HMTs. One is an "output-split type" where a hydraulic pump or hydraulic motor, which is connected to another hydraulic pump or hydraulic motor coupled to the planetary gear train by means of a hydraulic circuit, is coupled to the input shaft of the transmission so as to obtain a constant speed ratio. The other is an "input-split type" where a hydraulic pump or hydraulic motor, which is connected to another hydraulic pump or hydraulic motor coupled to the planetary gear train by means of a hydraulic circuit, is coupled to the output shaft of the transmission so as to obtain a constant speed ratio. Further, the output-split type and input-split type are respectively classified into six types according to which of the three elements of the planetary gear train is coupled to the hydraulic pump, hydraulic motor or input/output shafts and, in total, 12 types are available as basic combinations.

The conventional output-split type HMT and input-split type HMT will be respectively described in more detail.

FIG. 15(a) shows a schematic structural diagram of an output-split type HMT. In this output-split type HMT 100, a first gear 103 is secured to an input shaft 102 to which power from an engine 101 is input. A second gear 104 meshing with the first gear 103 is secured to a shaft 105a of a first pump/motor 105. Secured to the input shaft 102 is a sun gear 107 of a planetary gear train 106. A plurality of planetary gears 108 are disposed so as to mesh with the periphery of the sun gear 107. Each planetary gear 108 is axially supported by a planetary carrier 109 to which an output shaft 110 is secured. A ring gear 111 meshes with the periphery of the planetary gear set 108. Meshing with the periphery of the ring gear 111 is a third gear 112 which is, in turn, secured to a shaft 113a of a second pump/motor 113. In this arrangement, the first pump/motor 105 is hydraulically connected to the second pump/motor 113 by a piping 114.

In such a system, when the rotational speed of the second pump/motor 113, that is, the rotational speed of the ring gear 111 is zero, hydraulically transmitted power becomes zero so that all power is transmitted through the mechanical unit. On the basis of the rotational speed of the output shaft 110 at that time, the operation of this system will be described below.

(1) When increasing the rotational speed of the output shaft 110, the second pump/motor 113 receives motive power through the medium of hydraulic pressure and is activated to increase the rotational speed of the output shaft 110. At that time, the first pump/motor 105 serves as a pump whereas the second pump/motor 113 serves as a motor, so that energy is transmitted from the first pump/motor 105 to the second pump/motor 113 through the medium of hydraulic pressure. Then, the horsepower transmitted by hydraulic power becomes plus (+) as indicated by line A–B in FIG. 15(b) and the hydraulic power flows in a forward direction, i.e., from the input shaft 102 toward the planetary gear train 106.

(2) When reducing the rotational speed of the output shaft 110, the second pump/motor 113 receives motive power from the planetary gear train 106 and rotates in a direction opposite to that of the case (1). At that time, the second pump/motor 113 serves as a pump whereas the first pump/motor 105 serves as a motor, so that energy is transmitted from the second pump/motor 113 to the first pump/motor 105 through the medium of hydraulic pressure. Then, the horsepower transmitted by hydraulic power becomes minus (−) as indicated by line A-C in FIG. 15(b) and the hydraulic power flows in a reverse direction, i.e., from the planetary gear train 106 toward the input shaft 102.

FIG. 16(a) shows an input-split type HMT 200 in which the planetary gear train 106 is disposed on the side of the input shaft 102 whereas the first pump/motor 105 is disposed on the side of the output shaft 110. In FIG. 16(a), the parts that are substantially equivalent or function substantially similarly to those of the transmission 100 shown in FIG. 15(a) are indicated by the same numerals as in FIG. 15(a), and a detailed explanation of them is skipped herein.

The input-split type transmission 200 is constructed as follows.

(1) When increasing the rotational speed of the output shaft 110, the second pump/motor 113 serves as a motor while the first pump/motor 105 serves as a pump, so that energy is transmitted from the first pump/motor 105 to the second pump/motor 113 through the medium of hydraulic pressure. Then, the horsepower transmitted by hydraulic power becomes minus (−) as indicated by line A-D in FIG. 16(b) and the hydraulic power flows in a reverse direction, i.e., from the output shaft 110 toward the planetary gear train 106.

(2) When reducing the rotational speed of the output shaft 110, the second pump/motor 113 receives motive power from the planetary gear train 106 and rotates in a direction opposite to that of the case (1). At that time, the second pump/motor 113 serves as a pump whereas the first pump/motor 105 serves as a motor, so that energy is transmitted from the second pump/motor 113 to the first pump/motor 105 through the medium of hydraulic pressure. Then, the horsepower transmitted by hydraulic power becomes plus (+) as indicated by line A–E in FIG. 16(b) and the hydraulic power flows in a forward direction, i.e., from the planetary gear train 106 toward the output shaft 110.

As such, in both of the output-split type and input-split type transmissions, energy flows in forward and reverse directions occur in the speed increasing area and the speed reducing area. The energy transmission efficiency in this case will be hereinafter examined, taking the output-split type HMT 100 shown in FIG. 15 for example. Herein, the transmission efficiency of the mechanical unit is 95% and the transmission efficiency of the hydrostatic unit is 80% (Generally, where pump-motors are used, transmission efficiency is low). For easy comparison, assume that the amount of engine power is 1.0 and one third the engine power is input to the hydrostatic unit.

FIG. 17(*a*) shows the case where hydraulic power flows in the forward direction. Specifically, one third (0.333 part) the energy output from the engine 101 flows to the hydrostatic unit for increasing speed. Transmitted to the output shaft 110 are 0.633 (=(1−⅓)×0.95) part of energy from the mechanical unit and 0.267 (=0.333×0.8) part of energy from the hydrostatic unit. As a result, the overall efficiency becomes 0.9 (=0.633+0.267). The case where hydraulic power flows in the reverse direction is shown in FIG. 17(*b*). In this case, 1.267 (=1+0.267) parts of energy are input to the mechanical unit and 1.20 (=1.267×0.95) parts of energy are transmitted, so that the overall efficiency is 0.870 (=1.20−0.333).

As just described, when hydraulic power flows in the reverse direction, a large flow of energy occurs in each element, resulting in poor efficiency. In other words, a forward flow of hydraulic energy is better than a reverse flow of hydraulic energy. As seen from FIGS. 17(*a*) and 17(*b*), if part of energy flows in the reverse direction, the amount of energy that passes through the mechanical unit will increase, and therefore, there arises a need to increase the size of the planetary gear train, which leads to a disadvantage in economical efficiency.

As an attempt to solve the problems of the prior art output-split type HMT and input-split type HMT, there has been proposed a transmission capable of serving as an output-split type HMT when the rotational speed of the output shaft is increased and as an input-split type HMT when the rotational speed of the output shaft is reduced (Hereinafter, this proposed transmission is referred to as "output-split/input-split switching type HMT"). The output-split/input-split switching type HMT has several advantages. For instance, the horsepower transmitted by hydraulic power can be kept to be plus irrespective of the rotational speed of the output shaft, so that hydraulic power can be allowed to constantly flow in the forward direction and increased energy efficiency can be achieved in all speed regions ranging from the low speed region to the high speed region.

In a vehicle control system having the output-split HMT 100, a vehicle control system having the input-split HMT 200 and a vehicle control system having the output-split/input-split switching type HMT, the rotational speed of the engine 101 depends on the opening of the throttle and load torque. The load torque varies according to the rotational speed ratio of the output shaft to the input shaft of the transmission 100 (200) (=output shaft rotational speed/input shaft rotational speed: this ratio is hereinafter referred to as "speed ratio"). Accordingly, as the speed ratio increases, the engine speed decreases, and as the speed ratio decreases, the engine speed increases. The speed ratio is varied by controlling the tilt angles of the swash plates of the first and second pump/motors 105, 113.

In the above vehicle control systems, the engine is brought into a running condition most suitable for the opening of the throttle in such a way that an engine speed at which the engine can be operated in an optimum running condition is set as a target engine speed and the actual speed of the engine is made close to the target engine speed by speed ratio control in which the tilt angles of the swash plates are controlled.

In addition, the above vehicle control systems are provided with a decelerator for arbitrarily restricting the speed ratio within an upper limit that is set based on the lever position of a lever for setting a maximum speed. By operating the decelerator to limit the speed ratio, the output shaft rotational speed (=vehicle speed) of the transmission 100 (200) is reduced.

However, the above vehicle control systems have not proved successful in that although restriction of the speed ratio through operation of the decelerator causes the rotational speed of the output shaft (i.e., vehicle speed) to decrease, the engine speed increases, which gives the operator a feeling of operational disorder.

The present invention is directed to overcoming the foregoing shortcomings and a primary object of the invention is therefore to provide a vehicle control system capable of decreasing the rotational speed (i.e., vehicle speed) of the output shaft of the transmission in response to decelerating operation while decreasing engine speed, so that the operator does not feel strangeness during operation.

SUMMARY OF THE INVENTION

The above object can be accomplished by a vehicle control system according to the invention which has an engine and a hydro-mechanical transmission formed such that power from the engine is transmitted from an input shaft to an output shaft through a mechanical transmission unit and a hydrostatic transmission unit, the vehicle control system comprising:

(a) target engine speed altering means for changing, according to an operating amount, a target engine speed set as a target value for the actual speed of the engine;

(b) target speed ratio calculating means for calculating a target value for the speed ratio of the hydro-mechanical transmission which target value makes the actual speed of the engine coincident with the target engine speed;

(c) hydrostatic transmission unit controlling means for controlling the hydrostatic transmission unit so as to make the actual speed ratio of the hydro-mechanical transmission coincident with the target speed ratio calculated by the target speed ratio calculating means; and (d) engine controlling means for controlling the engine such that if the target engine speed is changed from a first target value to a second target value lower than the first target value by the target engine speed altering means, the output torque of the engine is reduced, while keeping the ratio of the amount of change in the output torque of the engine to the amount of change in the target engine speed constant or substantially constant.

According to the invention, if a first target value is set for the actual speed of the engine, the target speed ratio calculating means calculates a target value for the speed ratio of the hydro-mechanical transmission (hereinafter referred to as "transmission") such that the actual speed of the engine becomes coincident with the first target value. Then, the hydrostatic transmission unit controlling means controls the hydrostatic transmission unit such that the actual speed ratio of the transmission becomes coincident with the target speed ratio calculated by the target speed ratio calculating means. With this arrangement, the transmission performs gear shifting operation (torque conversion) such that the transmission generates, from its output shaft, output torque which matches a driving force required for an imposed load, while regarding an engine output torque value corresponding to the first target value as an input torque value and keeping this input torque value constant, and then, a first driving force—output shaft rotational speed characteristic is set based on the gear shifting operation. If the target engine speed is changed from the first target value to a second target value lower than the first target value by the target engine speed altering means, the transmission performs gear shifting operation (torque conversion), similarly to the case described above, such that the transmission generates, from its output shaft, output torque matching a driving force required for an imposed load, while regarding an engine output torque value corresponding to the second target value as an input torque value and keeping this input torque value constant, and then, a second driving force—output shaft rotational speed characteristic is set based on the gear shifting operation.

The invention will be explained with reference to FIG. 6. If the target engine speed is changed from a first target value $N_a$ to a second target value $N_b$ lower than the first target value $N_a$ by the target engine speed altering means, the engine controlling means reduces the output torque of the engine in such a way that the ratio ($\Delta T/\Delta N$) of the amount of change $\Delta T$ (=$T_a-T_b$) in the output torque of the engine to the amount of change $\Delta N$ (=$N_a-N_b$) in the target engine speed is kept constant or substantially constant, in other words, the average change rate (indicated by the inclination of line a–b) of engine output torque in the target engine speed transition region ($N_a$ to $N_b$) is kept constant or substantially constant. More specifically, with the change ($N_a \rightarrow N_b$) in the target engine speed, the engine output torque characteristic changes from the engine output torque characteristic line (only the essential part is shown) indicated by $TL_a$ in FIG. 6 to the engine output torque characteristic line (only the essential part is shown) indicated by $TL_b$ in FIG. 6. In the graph representing driving force verses the rotational speed of the output shaft, the second driving force/output shaft rotational speed characteristic $WL_b$ is in the lower side of the rotational speed of the output shaft than the first driving force/output shaft speed characteristic $WL_a$ is, and therefore the rotational speed of the output shaft, which is determined by determining a driving force F required for the load, is reduced ($V_a \rightarrow V_b$).

In an application in which the vehicle control system of the invention is incorporated in a work vehicle such as a bulldozer, since the target engine speed can be reduced by operation of the target engine speed altering means (e.g., decelerator), engine speed can be reduced at the same time that vehicle speed is reduced, so that a feeling of operational disorder will not be caused unlike the conventional systems. In addition, by setting the target engine speed transition characteristic line (only the essential part is shown) indicated by NL in FIG. 7, in other words, by adjusting the amount of reduction in the output torque of the engine in relation to the amount of change in the target engine speed in the above-described engine control, there occurs a transition to the second driving force/output shaft rotational speed characteristic $WL_b$ which is in the lower sides of driving force and the rotational speed of the output shaft in the driving force/output shaft rotational speed characteristic graph, compared to the first driving force/output shaft rotational speed characteristic $WL_a$. This leads to such an advantage that where the driving force required for the load varies at a low transition level, reliable speed control can be achieved in low speed ranges.

DETAILED DESCRIPTION OF THE INVENTION

Referring now to the accompanying drawings, a vehicle control system will be concretely described according to preferred embodiments of the invention.

(First Embodiment)

Figure 1:
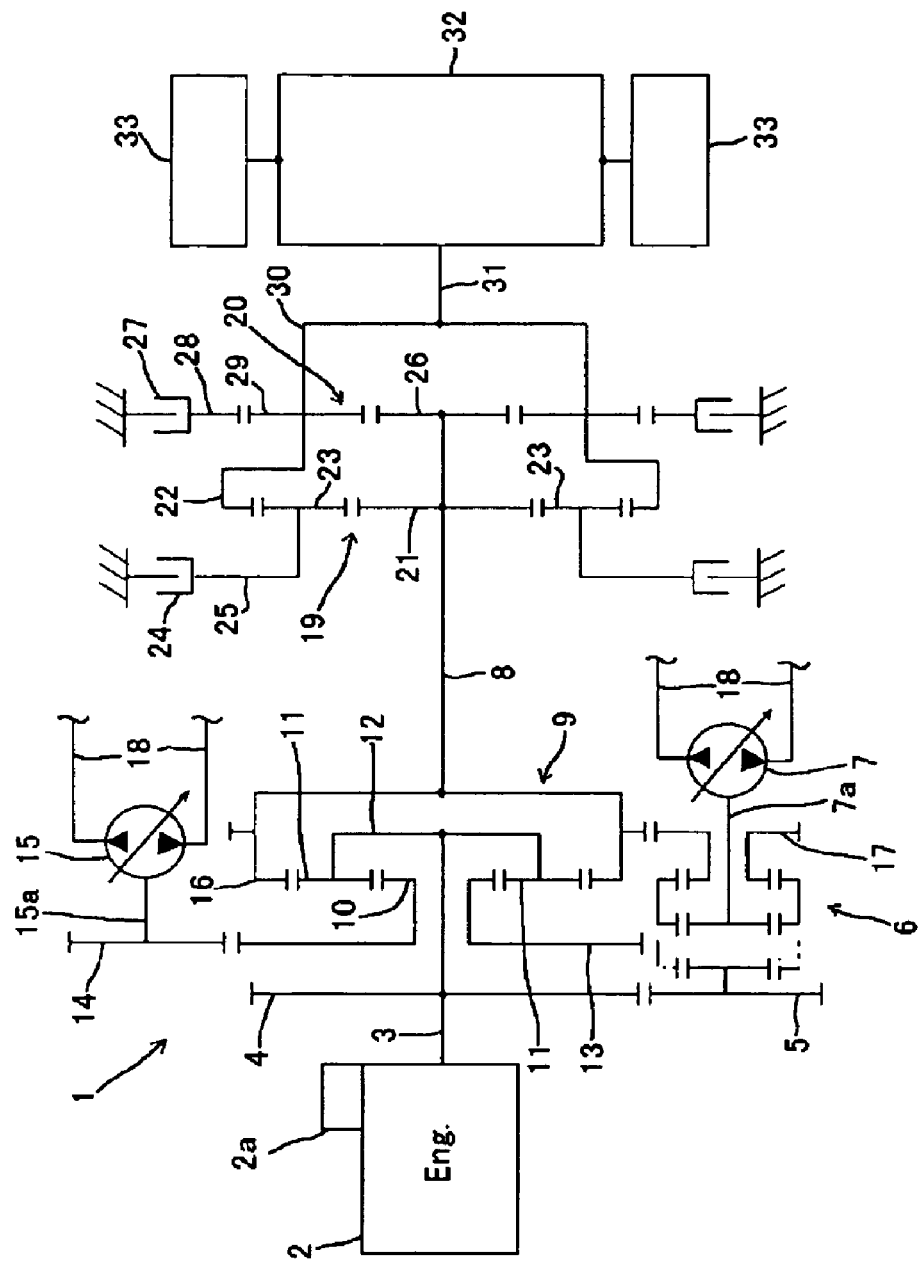
FIG. 1 is a schematic structural diagram of a vehicle control system according to a first embodiment of the invention.

FIG. 1 is a schematic structural diagram of a vehicle control system according to a first embodiment of the invention. While this embodiment is associated with a case where the invention is applied to the driving system of a track type vehicle such as a bulldozer, it is apparent that the invention is not limited to this.

The vehicle control system of the first embodiment has a diesel engine 2 and a hydro-mechanical transmission 1 (hereinafter referred to as "transmission 1") designed to transmit the power of the engine 2 from its input shaft to its output shaft through a mechanical transmission unit and a hydrostatic transmission unit.

Mounted on the engine 2 is an accumulator (common rail) type fuel injection system 2a. This fuel injection system 2a itself is well known in the art and therefore is not illustrated in detail in the drawings. Briefly, the fuel injection system 2a is designed to force fuel into an accumulator by a fuel transfer pump and inject fuel from an injector by opening/closing of a solenoid-controlled valve. Fuel injection characteristics are determined by a drive signal sent from a controller 40 (described later) to the solenoid-controlled valve so that desired injection characteristics can be obtained for all speeds of the engine 2 ranging from the low speed region to the high speed region. In the first embodiment, a so-called electronically-controlled injection system composed of the fuel injection system 2a, the controller 40 and various sensors (typically including an engine speed sensor 50 described later) constitutes an engine control system (corresponding to the engine controlling means of the invention). In such an electronically-controlled injection system, a target injection characteristic is mapped by digital values thereby obtaining the engine characteristics described later.

In the transmission 1, a first gear 4 is secured to an input shaft 3 to which power from the engine 2 is input. The first gear 4 meshes with a second gear 5 which can be coupled to a shaft 7a of a first pump/motor 7 through a synchromesh mechanism (clutch mechanism) 6. The synchromesh mechanism 6 is disposed between the second gear 5 and a fifth gear 17 (described later), for selectively synchronizing the rotation of the shaft 7a with the rotation of the second gear 5 or the rotation of the fifth gear 17 at the time of switching operation.

Disposed between the input shaft 3 and an intermediate output shaft 8 which are aligned on the same axis line is a planetary gear train 9 for gear shifting. On the input shaft 3, a sun gear 10 of the gear-shifting planetary gear train 9 is rotatably supported and a planetary carrier 12 for axially supporting a plurality of planetary gears 11 is secured. A third gear 13 having large diameter is integrally coupled to the sun gear 10. A fourth gear 14 meshes with the periphery of the third gear 13 and is secured to a shaft 15a of a second pump/motor 15. A ring gear 16 meshes with the periphery of the planetary gear set 11. Secured to the ring gear 16 is the intermediate output shaft 8. The fifth gear 17 meshes with the periphery of the ring gear 16, being rotatably and axially supported by the shaft 7a of the first pump/motor 7. The first pump/motor 7 and the second pump/motor 15 are connected to each other through a hydraulic piping 18.

The intermediate output shaft 8 is provided with a single planetary type reverse planetary gear train 19 and forward planetary gear train 20. The reverse planetary gear train 19 is composed of a sun gear 21 secured to the intermediate output shaft 8; a ring gear 22 located outside the sun gear 21; a planetary gear 23 located between the gears 21, 22 so as to mesh therewith; and a planetary carrier 25 for the planetary gear 23, that can be hydraulically braked by a reverse hydraulic clutch 24. The forward planetary gear train 20 is composed of a sun gear 26 secured to the intermediate output shaft 8; a ring gear 28 that is located outside the sun gear 26 and can be hydraulically braked by a forward hydraulic clutch 27; a planetary gear 29 located between the gears 26, 28 so as to mesh therewith; and a planetary carrier 30 for the planetary gear 29, that is integrally secured to the ring gear 22 of the reverse planetary gear train 19.

The planetary carrier 30 is coupled to an output shaft 31 which is in turn coupled to a hydraulically-steering type steering unit 32 disposed on a transverse shaft through a bevel gear. The steering unit 32 is coupled to right and left final reduction gears 33. Power transmitted from the output shaft 31 to the transverse shaft is then transmitted to right and left sprockets for driving right and left crawler belts respectively through the steering unit 32, the final reduction gears 33 and others.

Figure 15:
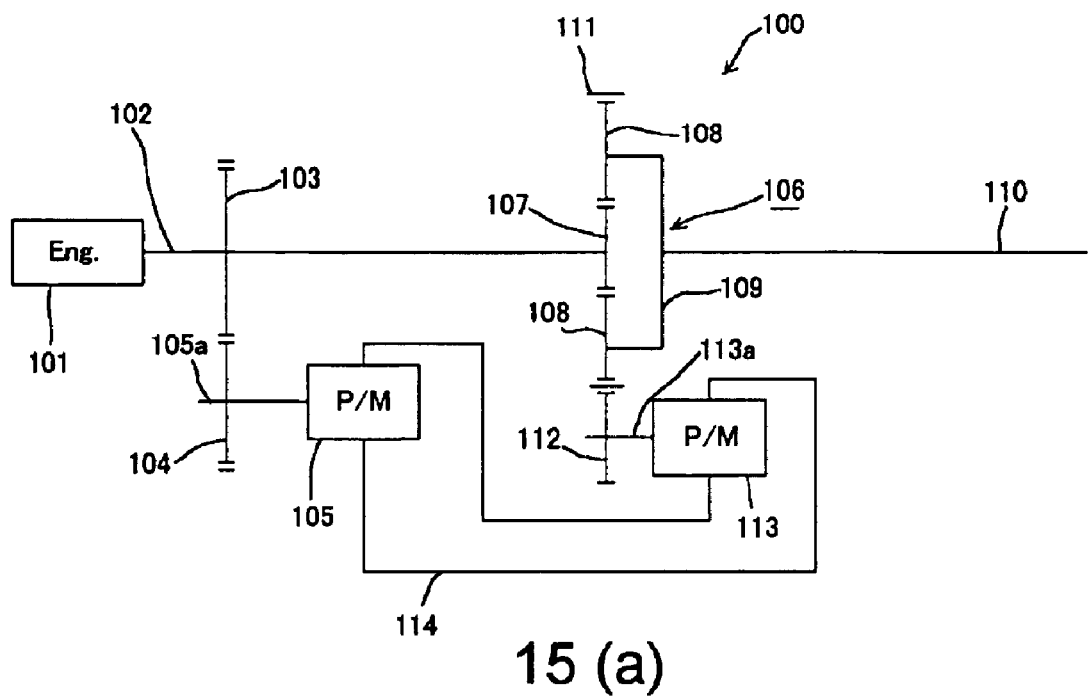
FIGS. 15(a) and 15(b) are a schematic structural diagram and transmitted horsepower characteristic graph, respectively, of a prior art output-split type HMT having two pump/motors.
Figure 15:
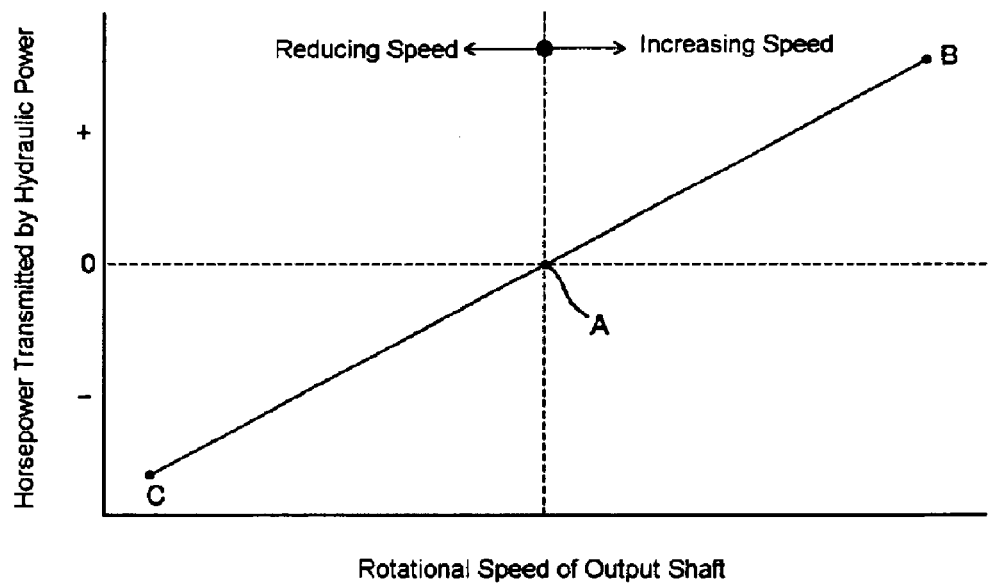
Figure 16:
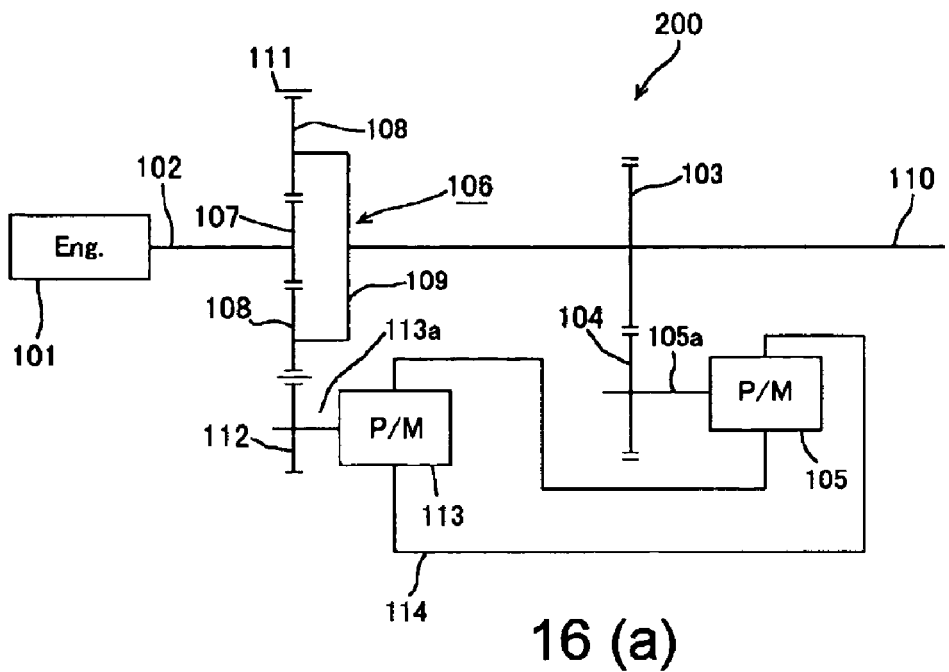
FIGS. 16(a) and 16(b) are a schematic structural diagram and transmitted horsepower characteristic graph, respectively, of a prior art input-split type HMT having two pump/motors.
Figure 16:
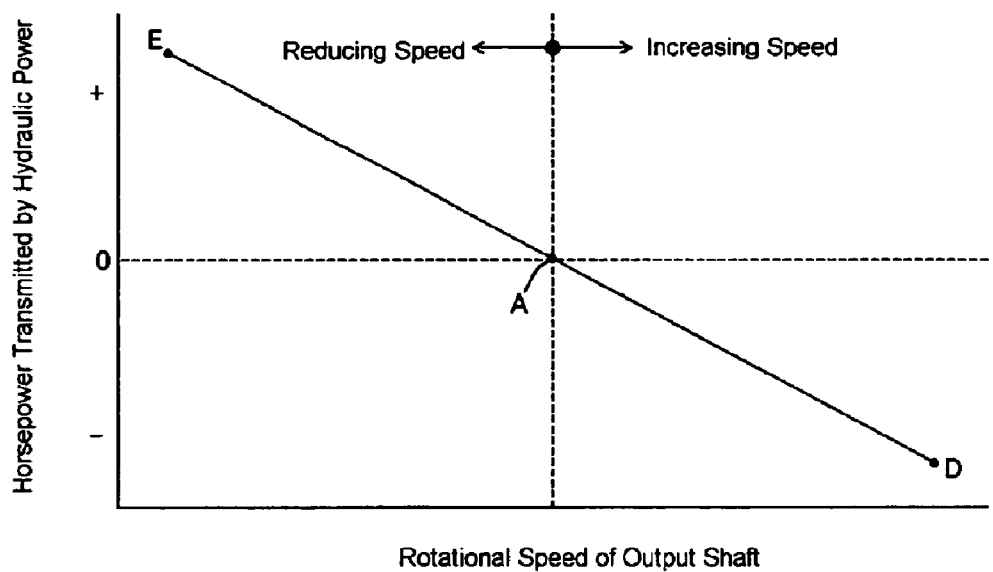
Figure 17:
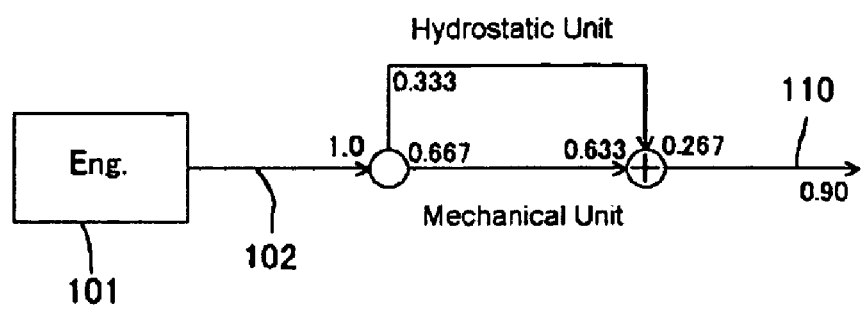
FIGS. 17(a) and 17(b) are explanatory diagrams illustrating the difference in efficiency between different energy flows according to the prior art.
Figure 17:
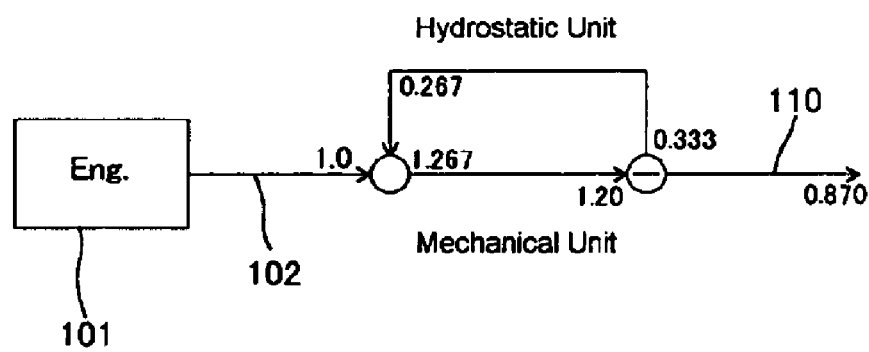

In the transmission 1 of the first embodiment, where the shaft 7a of the first pump/motor 7 is coupled to the second gear 5 by the synchromesh mechanism 6, the first pump/motor 7 is positioned on the input shaft 3 side, so that the transmission 1 serves as an output-split type HMT (see FIG. 15). Where the shaft 7a of the first pump/motor 7 is coupled to the fifth gear 17, the first pump/motor 7 is positioned on the intermediate output shaft 8 side, so that the transmission 1 serves as an input-split type HMT (see FIG. 16).

Specifically, if the shaft 7a of the first pump/motor 7 is coupled to the second gear 5 side when the rotational speed of the intermediate output shaft 8 is on the speed increasing side, the first pump/motor 7 serves as a pump whereas the second pump/motor 15 serves as a motor. Therefore, energy flows, through the medium of hydraulic pressure, from the first pump/motor 7 to the second pump/motor 15. In other words, hydraulic power flows, in a forward direction, from the input shaft 3 to the intermediate output shaft 8. Accordingly, power from the engine 2 is input to the planetary carrier 12 and power from the second pump/motor 15 functioning as a motor is input to the sun gear 10, while rotary power is output from the planetary carrier 12 to the input shaft (shaft 7a) of the first pump/motor 7 functioning as a pump and rotary power is output from the ring gear 16 to the intermediate output shaft 8.

On the other hand, if the shaft 7a of the first pump/motor 7 is coupled to the fifth gear 17 side when the rotational speed of the intermediate output shaft 8 is on the speed decreasing side, the first pump/motor 7 serves as a motor whereas the second pump/motor 15 serves as a pump. Therefore, energy flows, through the medium of hydraulic pressure, from the second pump/motor 15 to the first pump/motor 7. In other words, hydraulic power flows, in a forward direction, from the input shaft 3 to the intermediate output shaft 8. Accordingly, power from the engine 2 is input to the planetary carrier 12 and power from the first pump/motor 7 functioning as a motor is input to the ring gear 16, while rotary power is output from the sun gear 10 to the input shaft (shaft 15a) of the second pump/motor 15 functioning as a pump and rotary power is output from the ring gear 16 to the intermediate output shaft 8.

Figure 2:
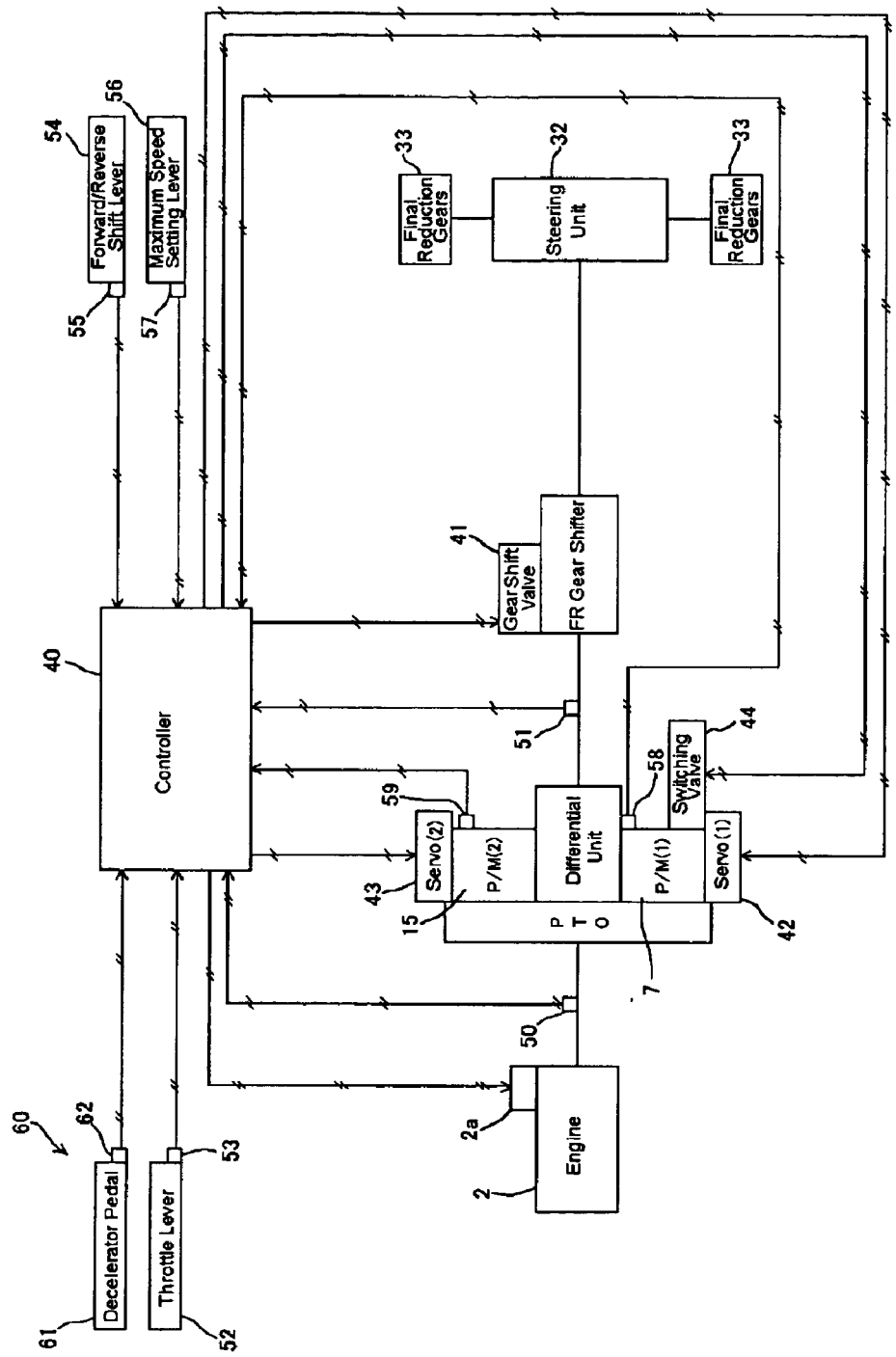
FIG. 2 is a control block diagram of the vehicle control system of the first embodiment.

Now, reference is made to the control block diagram of FIG. 2 for explaining the basic configuration of the control unit of the vehicle control system according to the first embodiment.

In the control block diagram shown in FIG. 2, the output shaft of the engine 2 is provided with an engine speed sensor 50 for detecting the actual rotational speed of the output shaft of the engine 2, and the output shaft (i.e., intermediate output shaft 8) of the differential unit (i.e., planetary gear train 9) is provided with a transmission output shaft speed sensor 51 for detecting the actual rotational speed of the output shaft of the differential unit. A throttle lever 52 for setting a throttling amount for the engine 2 is provided with a throttle lever position sensor 53 for detecting the lever position of the throttle lever 52. A forward/reverse shift lever 54 for shifting between forward and reverse is provided with a forward/reverse shift lever position sensor 55 for detecting which of forward (F), neutral (N) and reverse (R) the forward/reverse shift lever 54 is placed in. A maximum speed setting lever 56 for setting a maximum speed for the vehicle is provided with a maximum speed setting lever position sensor 57 for detecting the lever position of the maximum speed setting lever 56. The shaft 7a of the first pump/motor 7 is provided with a first pump/motor speed sensor 58 for detecting the actual rotational speed of the shaft 7a, whereas the shaft 15a of the second pump/motor 15 is provided with a second pump/motor speed sensor 59 for detecting the actual rotational speed of the shaft 15a. A decelerator 60 for decelerating the vehicle is provided with a decelerator pedal operating amount sensor 62 for detecting the operating amount of a decelerator pedal 61 operated by hoot. Input to the controller 40 are (a) an engine speed signal from the engine speed sensor 50; (b) a transmission output shaft speed signal from the transmission output shaft speed sensor 51; (c) a throttle lever position signal (throttle signal) from the throttle lever position sensor 53; (d) a forward/reverse shift lever position signal (forward/reverse shifting signal) from the forward/reverse shift lever position sensor 55; (e) a maximum speed setting lever position signal (maximum speed setting signal) from the maximum speed setting lever position sensor 57; (f) a first pump/motor speed signal from the first pump/motor speed sensor 58; (g) a second pump/motor speed signal from the second pump/motor speed sensor 59; and (h) a decelerator pedal operating amount signal (decelerating signal) from the decelerator pedal operating amount sensor 62. It should be noted that the decelerator 60 corresponds to the target engine speed altering means of the invention.

The controller 40 is composed of a central processing unit (CPU) for executing a specified program; a read only memory (ROM) for storing this program and various tables and maps; and a writable memory serving as a working memory necessary for execution of the program. In response to the engine speed signal, transmission output shaft speed signal, throttle lever position signal (throttle signal), forward/reverse shift lever position signal (forward/reverse shifting signal), maximum speed setting lever position signal (maximum speed setting signal), first pump/motor speed signal and second pump/motor speed signal, the controller 40 performs arithmetic operations through execution of the program. Then, the controller 40 sends a shift control signal to a gear shift valve 41, for shifting between the forward and reverse hydraulic clutches 27, 24. The controller 40 also sends an angle control signal to a servo mechanism 42 for controlling the swash plate angle of the first variable displacement type pump/motor 7 and to a servo mechanism 43 for controlling the swash plate angle of the second variable displacement type pump/motor 15. Further, the controller 40 sends a switch-over signal to a switching valve 44 for moving the sleeve (not shown) of the synchromesh mechanism 6.

Figure 3:
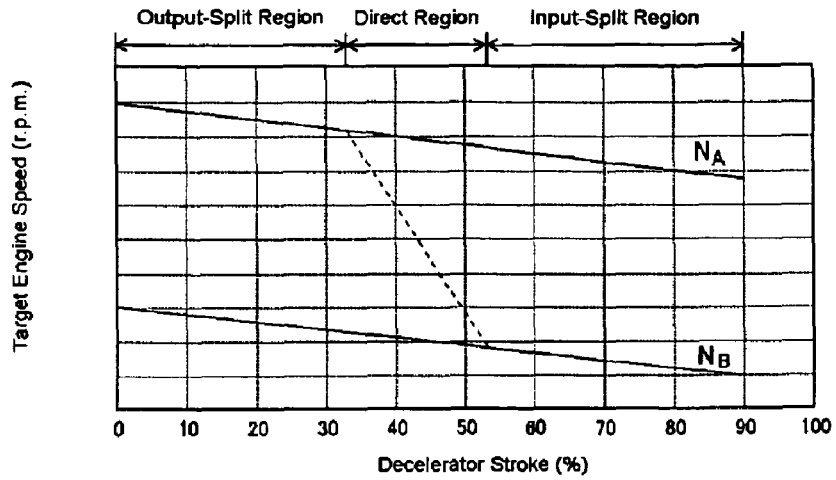
FIGS. 3(a) to 3(c) are target engine speed control maps according to the first embodiment.
Figure 3:
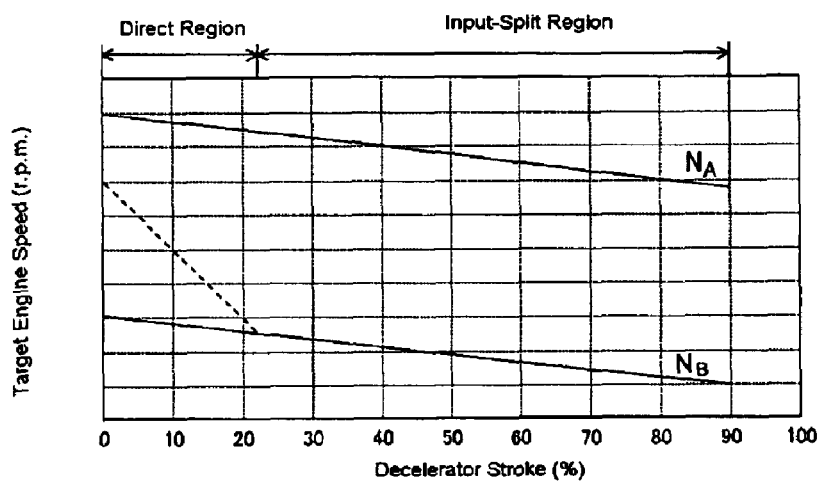
Figure 3:
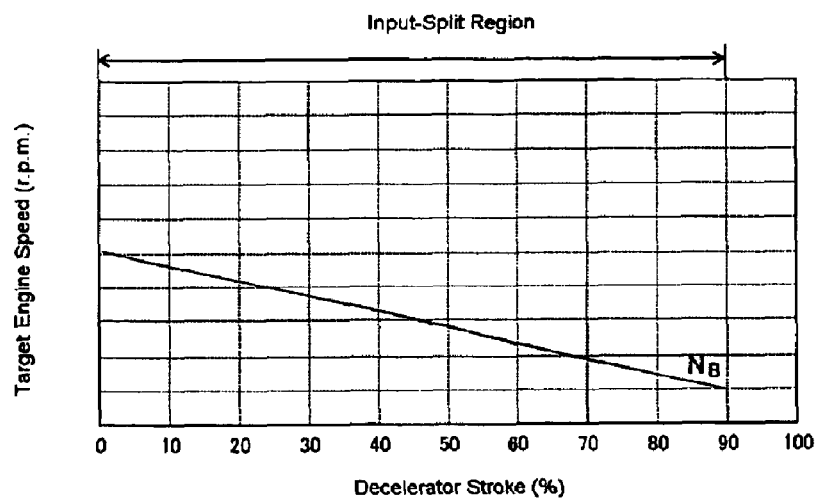

In the controller 40, the ROM stores target engine speed control maps (see FIGS. 3(*a*) to 3(*c*)) showing the relationship between target engine speed (a target for the actual speed of the engine 2) and decelerator stroke (the operating amount of the decelerator pedal 61). By looking up the target engine speed control maps with an input signal sent from the decelerator pedal operating amount sensor 62, a target engine speed corresponding to a decelerator stroke can be set. It should be noted that, in the following description, the target engine speed control map shown in FIG. 3(*a*) is referred to as "target engine speed control map (A)"; the target engine speed control map shown in FIG. 3(*b*) is as "target engine speed control map (B)"; and the target engine speed control map shown in FIG. 3(*c*) is as "target engine speed control map (C)".

By use of the following equation (1), the CPU of the controller 40 calculates a target value (target speed ratio) for the speed ratio of the transmission 1 (the ratio of the rotational speed of the intermediate output shaft 8 to the rotational speed of the input shaft 3 (engine speed)), which target value allows the actual speed of the engine 2 to coincide with the target engine speed. It should be noted that the CPU of the controller 40 corresponds to "the target speed ratio calculating means" of the invention.

$$E = e + k(n - N) \quad (1)$$

where E is a target speed ratio, e is an actual speed ratio (the actual rotational speed of the intermediate output shaft 8/the actual rotational speed of the input shaft 3 (actual engine speed)), k is a constant, n is an actual engine speed and N is a target engine speed.

An angle control signal for making the actual speed ratio e coincident with a target speed ratio E is sent from the controller 40 to the servo mechanisms 42, 43. Note that the arrangement including the controller 40 and the servo mechanisms 42, 43 corresponds to "the hydrostatic transmission unit controlling means" of the invention.

If the target engine speed N is changed from a first value to a second value lower than the first value through operation of the decelerator 60, the controller 40 outputs a drive signal to the fuel injection system 2a, for reducing the output torque of the engine while maintaining the ratio $\Delta T/\Delta N$ constant or substantially constant, the ratio $\Delta T/\Delta N$ being the ratio of the amount of change $\Delta T$ in the output torque of the engine to the amount of change $\Delta N$ in the target engine speed.

Figure 5:
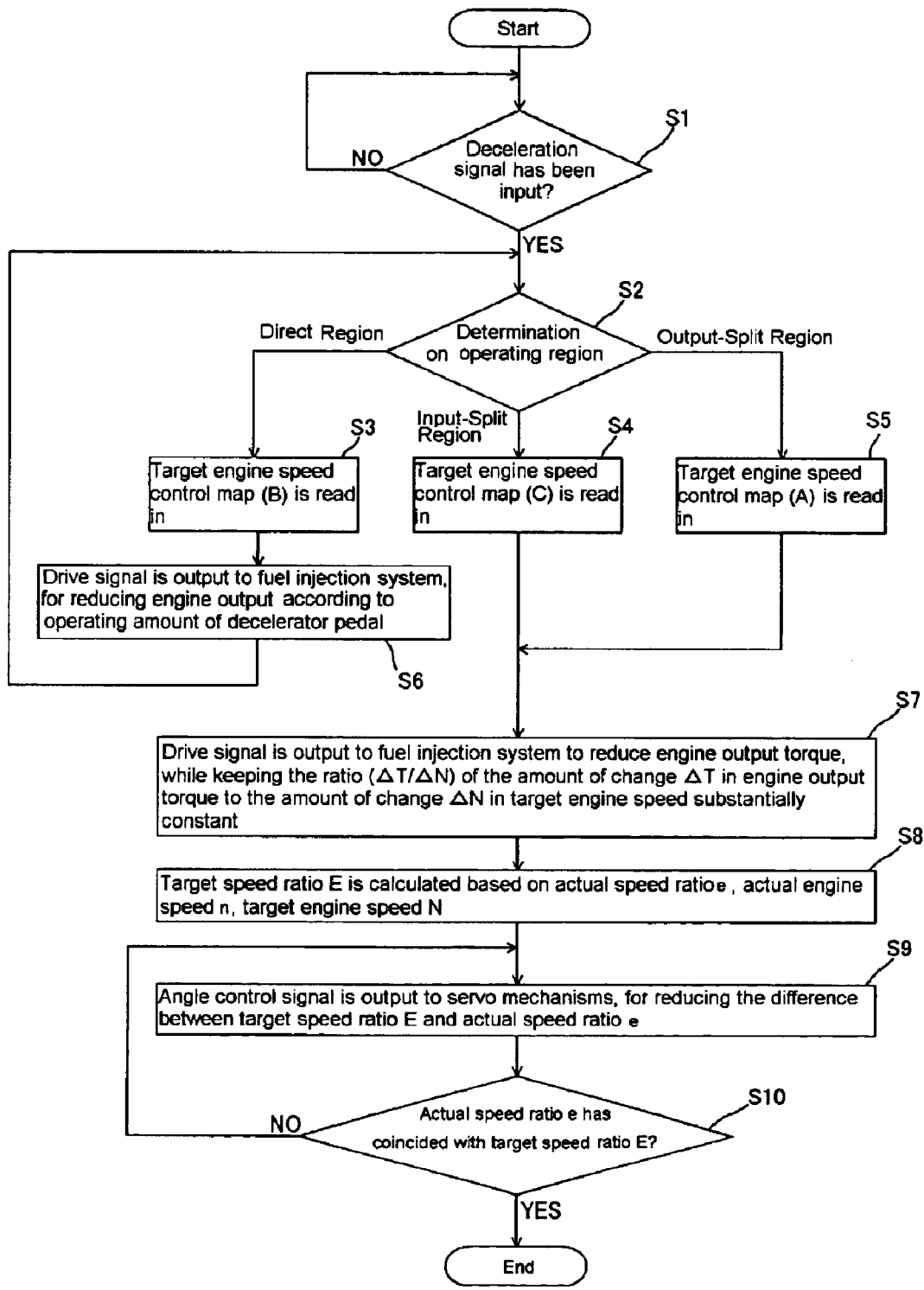
FIG. 5 is a flow chart of a process performed by a controller during vehicle deceleration.
Figure 6:
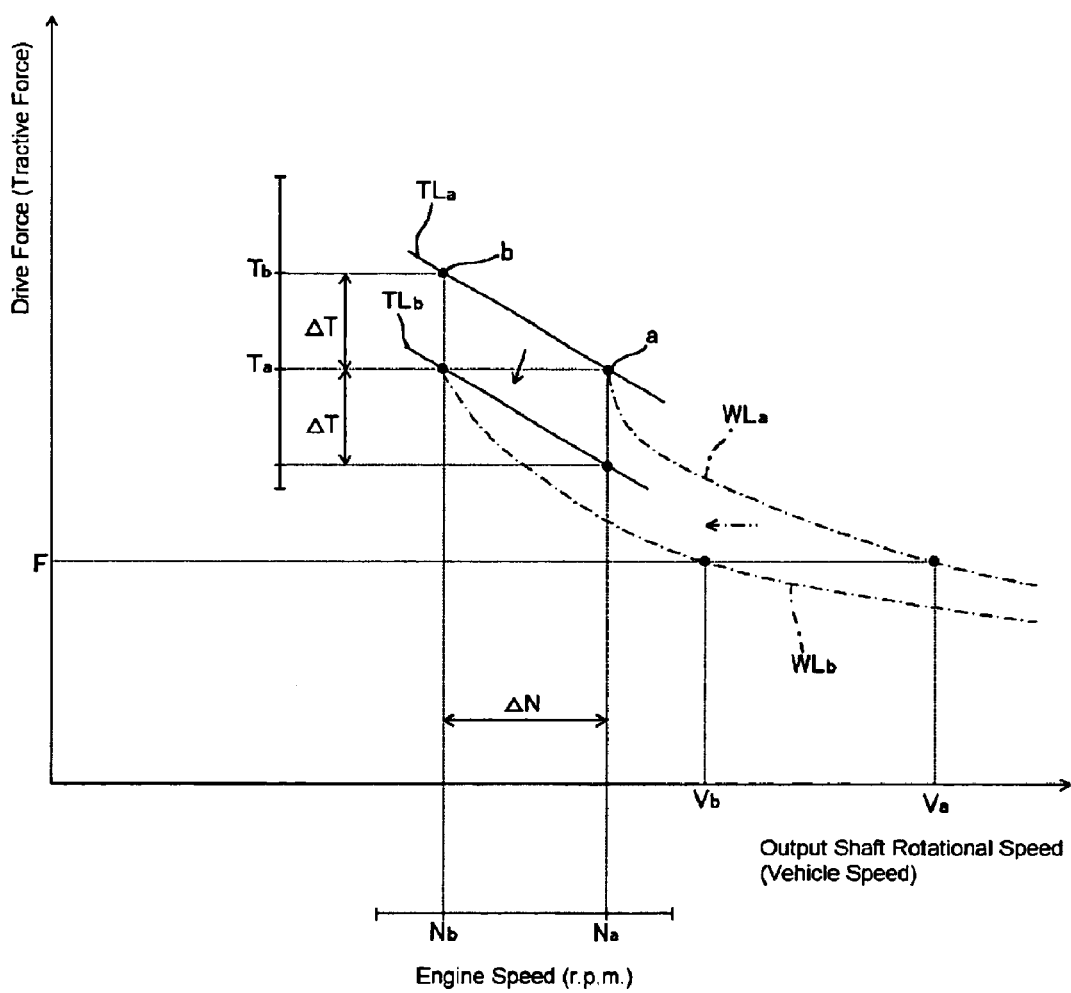
FIG. 6 is a graph (1) for explaining the fundamental principle of tractive force (driving force)/vehicle speed (output shaft rotational speed) characteristic control.
Figure 7:
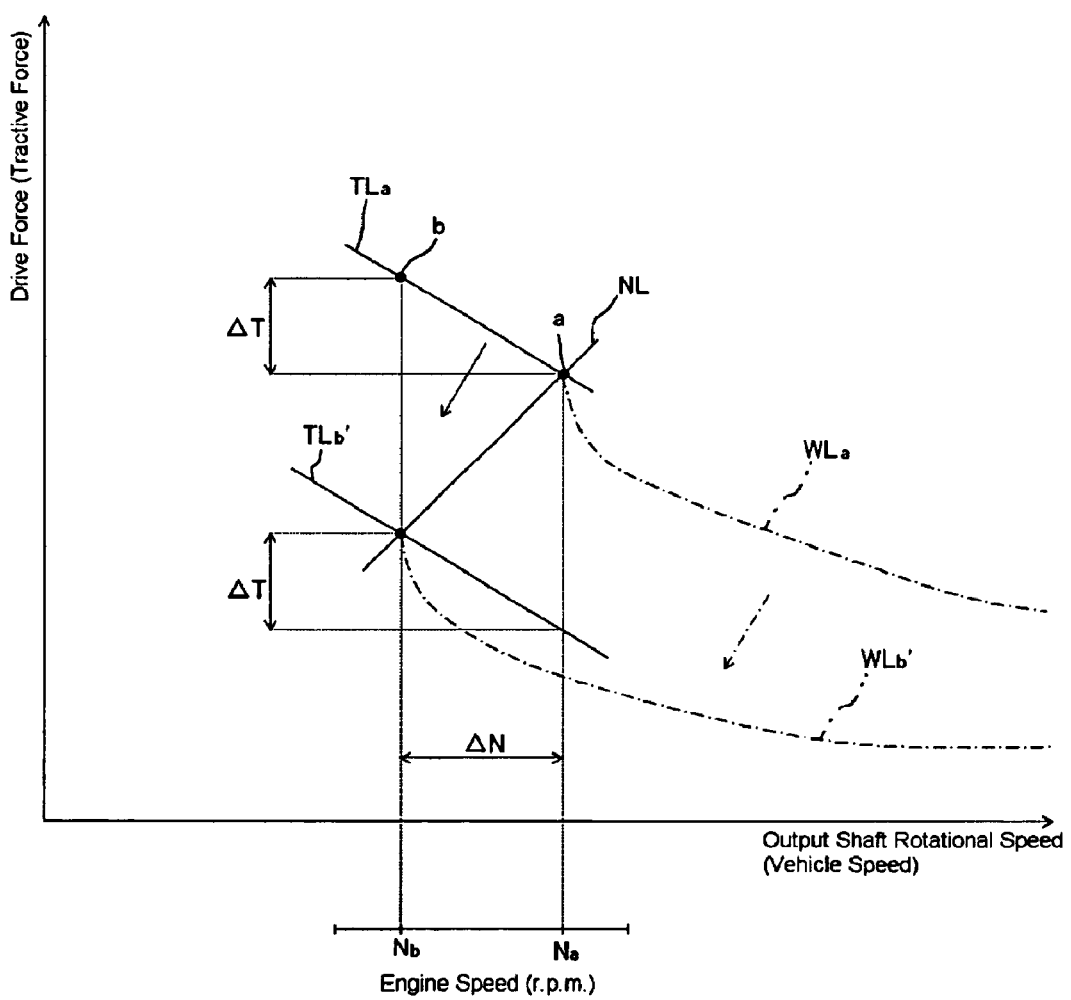
FIG. 7 is a graph (2) for explaining the fundamental principle of the tractive force (driving force)/vehicle speed (output shaft rotational speed) characteristic control.
Figure 8:
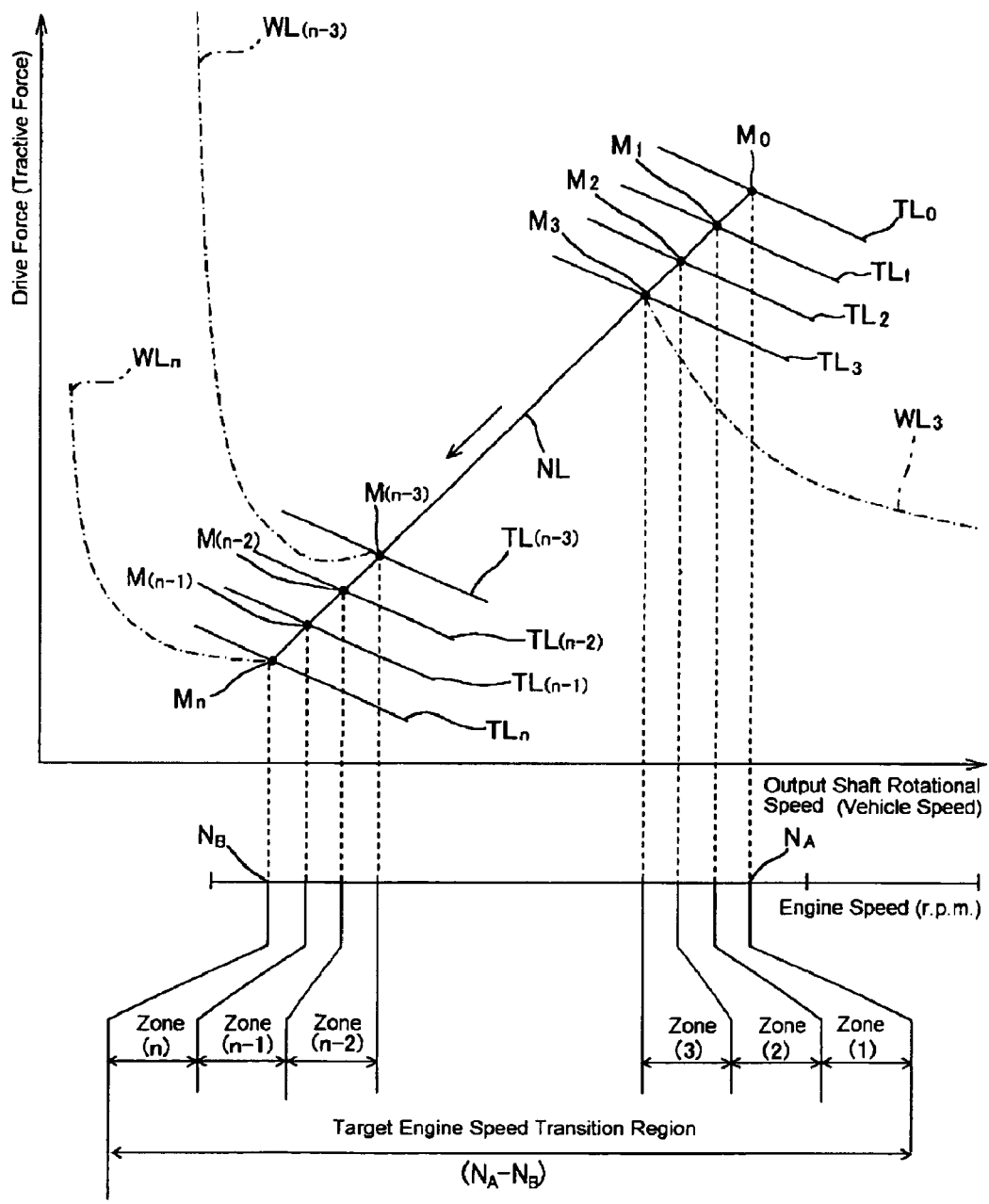
FIG. 8 is a graph (3) for explaining the fundamental principle of the tractive force (driving force)/vehicle speed (output shaft rotational speed) characteristic control.

Next, the switch-over control of the switching valve 44, the process performed by the controller 40 during vehicle deceleration, and the fundamental principle of the tractive force—vehicle speed characteristic control will be described in due order, with reference to FIG. 4, the flow chart of FIG. 5 and FIGS. 6, 8 respectively.

[Switch-Over Control of the Switching Valve 44 (See FIG. 4)]

Figure 4:
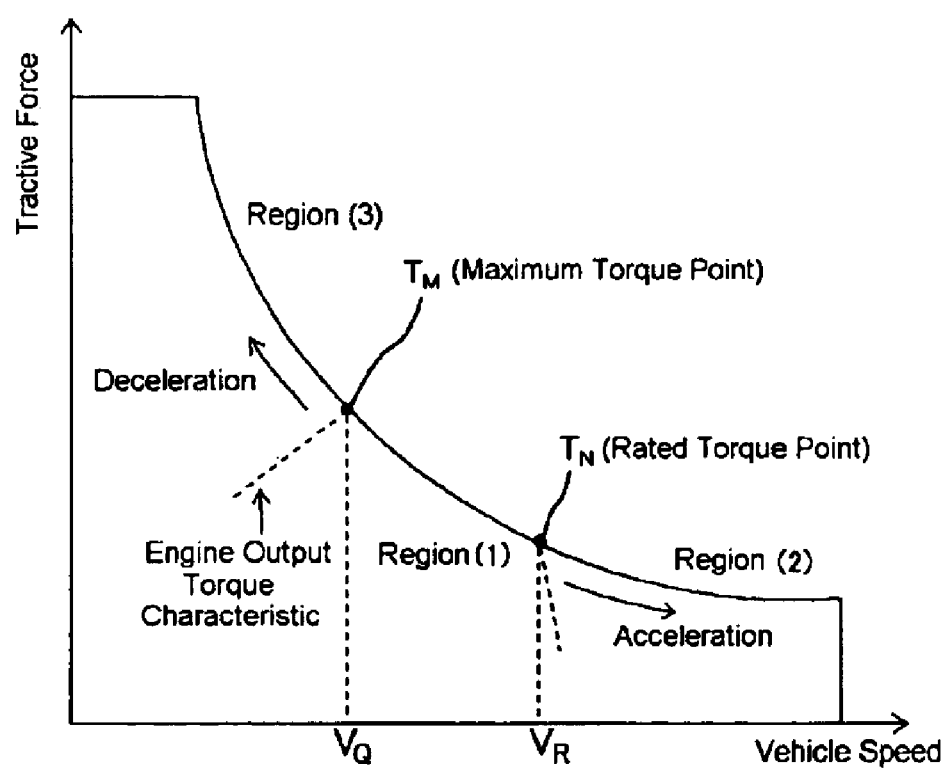
FIG. 4 is a vehicle tractive force/vehicle speed characteristic graph according to the first embodiment.

As shown in the tractive force/vehicle speed characteristic graph of FIG. 4, based on the tractive force and vehicle speed of the vehicle calculated from an input signal from the engine speed sensor 50, a vehicle speed region (Region (1)) is set for the range from a vehicle speed $V_Q$ corresponding to a maximum torque point $T_M$ of the engine 2 to a vehicle speed $V_R$ corresponding to a rated torque point $T_N$. Region (1) is the area (direct region) where the rotation of the second pump/motor 15 is stopped, that is, power transmission is carried out by the mechanical unit alone. If it is detected from input signals from the engine speed sensor 50 and the transmission output shaft speed sensor 51 that the vehicle speed has been increased from Region (1), in other words, the vehicle speed has entered a vehicle speed region (Region (2)) exceeding the vehicle speed $V_R$ corresponding to the rated torque point $T_N$, the first pump/motor 7 is then coupled to the second gear 5 (the input shaft 3 side) so that the transmission 1 functions as an output-split type transmission. On the other hand, if it is detected from input signals from the engine speed sensor 50 and the transmission output shaft speed sensor 51 that the vehicle speed has been reduced from Region (1), that is, the vehicle speed has entered a vehicle speed region (Region (3)) lower than the vehicle speed $V_Q$ corresponding to the maximum torque point $T_M$, the first pump/motor 7 is then coupled to the fifth gear 17 (the intermediate output shaft 8 side), so that the transmission 1 functions as an input-split type transmission.

It should be noted that, in the following description, the region where the transmission 1 functions as an output-split type transmission is called "output-split region", whereas the region where the transmission 1 functions as an input-split type transmission is called "input-split region". The tractive force/vehicle speed characteristic graph of FIG. 4 is a characteristic graph showing a condition where the decelerator 60 is not operated. The turning points for Regions (1), (2) and (3), which are specified by the maximum torque point $T_M$ and the rated torque point $T_N$, are shifted as described later during operation of the decelerator 60.

[The Process Performed by the Controller 40 During Deceleration of the Vehicle (See FIG. 5)]

Step S1: A check is made to whether a deceleration signal (decelerator pedal operating amount signal) has been input from the decelerator pedal operating amount sensor 62 provided for the decelerator 60, and the operating amount of the decelerator pedal is detected (S1). If a deceleration signal has been input, the program proceeds to Step S2.

Steps S2 to S5: At Step S2, it is determined which operating region the transmission 1 was placed in when the deceleration signal was input. This determination associated with the operating region is constantly made, irrespective of the presence/absence of a deceleration signal. The transmission 1 is operated in the input-split region (=Region (3) in FIG. 4) just after the vehicle has been started. The target speed ratio E which allows the volume ratio of the first pump/motor 7 to be zero is regarded as a reference speed ratio $e_c$. If the actual speed ratio e has exceeded the reference speed ratio $e_c$, it is then determined that the operating region in which the transmission 1 is operated has been changed from the input-split region to the direct region (=Region (1) in FIG. 4). If it is determined that the transmission 1 was operated in the direct region when the deceleration signal was input, the target engine speed control map (B) shown in FIG. 3(b) is read in (Step S3). The target engine speed control map (B) provides an upper limit speed NA and a lower limit speed $N_B$ for the operating amount of the decelerator pedal 61, i.e., the decelerator stroke when the transmission 1 is operated in the direct region. Specifically, if the actual speed n of the engine becomes lower than the lower limit speed $N_B$ while the transmission 1 is operated in the direct region, the operating region of the transmission 1 will be changed to the input-split region. If the actual engine speed n becomes higher than the upper limit speed $N_A$, the operating region of the transmission 1 will be changed to the output-split region (=region (2) in FIG. 4). If the actual speed ratio e becomes lower than the reference speed ratio $e_c$ when the transmission 1 works in the output-split region, the operating region will be changed to the direct region. If it is determined that a deceleration signal has been input and the transmission 1 is working in the input-split region, the target engine speed control map (C) shown in FIG. 3(c) is then read in (Step S4). If it is determined that a deceleration signal has been input and the transmission 1 is working in the output-split region, the target engine speed control map (A) shown in FIG. 3(a) is then read in (Step S5).

Steps S6 to S7: If the transmission 1 is operated in the direct region, a drive signal is output to the fuel injection system 2a to reduce the output of the engine according to the operating amount of the decelerator pedal 61 (Step S6). If the transmission 1 is operated in the input-split or output-split region, the target engine speed N is changed based on the target engine speed control map which has been read in at Step S4 or S5. Concurrently with the change of the target engine speed N, a drive signal is input to the fuel injection system 2a, for reducing the output torque of the engine while keeping the ratio ($\Delta T/\Delta N$) of the amount of change $\Delta T$ in the output torque of the engine to the amount of change $\Delta N$ in the target engine speed substantially constant (Step S7). It is also possible to execute Step S7 and onward after the operation of the transmission 1 in the direct region at Step S3, in the light of the consistency of the controls performed in all of the operating regions of the transmission 1. In this case, the target engine speed is as indicated by broken lines in the target engine speed control maps (A), (B). The part indicated by each broken line is shifted to the right and left on the graph according to the load imposed on the transmission 1.

Steps S8 to S10: The target speed ratio E is calculated, substituting the actual speed ratio e of the transmission 1, the actual engine speed n and the target engine speed N in the foregoing equation (1)[E=e+k (n−N)] (S8). An angle control signal for reducing the difference between the calculated target speed ratio E and the actual speed ratio e is output to the servo mechanisms 42, 43 until the actual speed ratio e becomes equal to the target speed ratio E (S9 to S10). To sum up, when the hydrostatic transmission unit of the HMT is working, the decelerator is controlled such that the amount of fuel injection is reduced by operation of the decelerator pedal and at the same time, the target engine speed for the HMT is decreased.

[The Fundamental Principle of Tractive Force—Vehicle Speed Characteristic Control (See FIG. 6)]

In the controller 40, after one target value $N_a$ for the actual engine speed of the engine 2 has been set, the CPU calculates a target value for the speed ratio of the transmission 1 based on the foregoing equation (1) such that the actual engine speed of the engine 2 becomes coincident with the target value $N_a$. Then, the calculated target value for the speed ratio is set as the target speed ratio E and the controller 40 outputs an angle control signal to the servo mechanisms 42, 43 to make the actual speed ratio e of the transmission 1 coincident with the target speed ratio E. Subsequently, the transmission 1 performs gear shifting (torque conversion) such that the engine output torque value corresponding to the target value $N_a$ is set as an input torque value and the transmission 1 generates, from its intermediate output shaft 8, output torque which matches the tractive force F required for the imposed load, while the input torque value is kept constant. Then, a tractive force—vehicle speed characteristic line $WL_a$ is set based on the gear shifting operation described above. Similarly, when the target engine speed N is changed from one target value $N_a$ to another target value $N_b$ that is lower than the target value $N_a$ through operation of the decelerator 60, the transmission 1 performs gear shifting (torque conversion) such that the engine output torque value corresponding to the target value $N_b$ is set as an input torque value and the transmission 1 generates, from its intermediate output shaft 8, output torque which matches the tractive force F required for the imposed load, while keeping the input torque value constant. Then, a tractive force —vehicle speed characteristic line $WL_b$ is set based on the gear shifting operation described above.

When the target engine speed N is changed from the target value $N_a$ to the lower target value $N_b$, the controller 40 outputs a drive signal to the fuel injection system 2a to reduce the output torque of the engine, while keeping the ratio $\Delta T/\Delta N$ constant or substantially constant. The ratio $\Delta T/\Delta N$ is the ratio of the amount of change $\Delta T$ (Ta−Tb) in the engine output torque value to the amount of change $\Delta N$ (=Na−Nb) in the target engine speed N, that is, the average change rate (the inclination indicated by line a-b) of engine output torque in the transition region (between $N_a$ and $N_b$)

of the target engine speed N. Accordingly, the engine output torque characteristic varies from the engine output torque characteristic line (only the essential part is shown) indicated by $TL_a$ in FIG. 6 to the engine output torque characteristic line (only the essential part is shown) indicated by $TL_b$ in FIG. 6. As a result, the tractive force—vehicle speed characteristic is also shifted to the tractive force—vehicle speed characteristic line $WL_b$ which is plotted in the lower vehicle speed side of the tractive force/vehicle speed characteristic graph than the tractive force—vehicle speed characteristic line $WL_a$ is. Then, the vehicle speed, which is determined by determining the tractive force F required for the imposed load, is reduced ($V_a \rightarrow V_b$).

Thereafter, the above-described engine control is carried out ($TL_0 \rightarrow TL_1$, $TL_1 \rightarrow TL_2$, $TL_2 \rightarrow TL_3$, ... $TL_{(n-3)} \rightarrow TL_{(n-2)}$, $TL_{(n-2)} \rightarrow TL_{(n-1)}$, $TL_{(n-1)} \rightarrow TL_n$,), as shown in FIG. 8, in each of n zones into which the target engine speed transition region ($N_A$–$N_B$) is divided, and the number of zones n is increased to the maximum. As a result, the point (hereinafter referred to as "matching point") specified by the engine output torque value corresponding to the engine speed value when the present target engine speed is coincident with the actual engine speed of the engine 2 is shifted on a target engine speed transition characteristic line NL which is set based on the target engine speed control map ($M_0 \rightarrow M_1 \rightarrow M_2 \rightarrow M_3$ ... $M_{(n-3)} \rightarrow M_{(n-2)} \rightarrow M_{(n-1)} \rightarrow M_n$). Thus, a tractive force—vehicle speed characteristic can be respectively set for the low load/high speed region, low load/low speed region and high load/low speed region of the tractive force/vehicle speed characteristic graph, by controlling setting of the target engine speed transition characteristic line NL, in other words, by controlling setting of the target engine speed control map (see the tractive force—vehicle speed characteristic lines indicated by $WL_3$, $WL_n$ and $WL_{(n-3)}$).

In this embodiment, the injection characteristics of the fuel injection system 2a are set such that the engine output torque characteristic of each zone becomes a characteristic which allows a constant transition of the output of the engine, that is, a characteristic which satisfies equi-horsepower regulation (see FIGS. 9 to 12). In this way, the excessive output of the engine is reduced to save fuel cost.

Next, the operation of the vehicle control system during vehicle deceleration will be described according to the first embodiment in the light of the fundamental principle of the tractive force—vehicle speed characteristic control described earlier. It should be noted that, in the following cases, deceleration is carried out with the engine 2 being in a full throttle condition.

[Deceleration within the Input-Split Region (See FIG. 9)]

Figure 9:
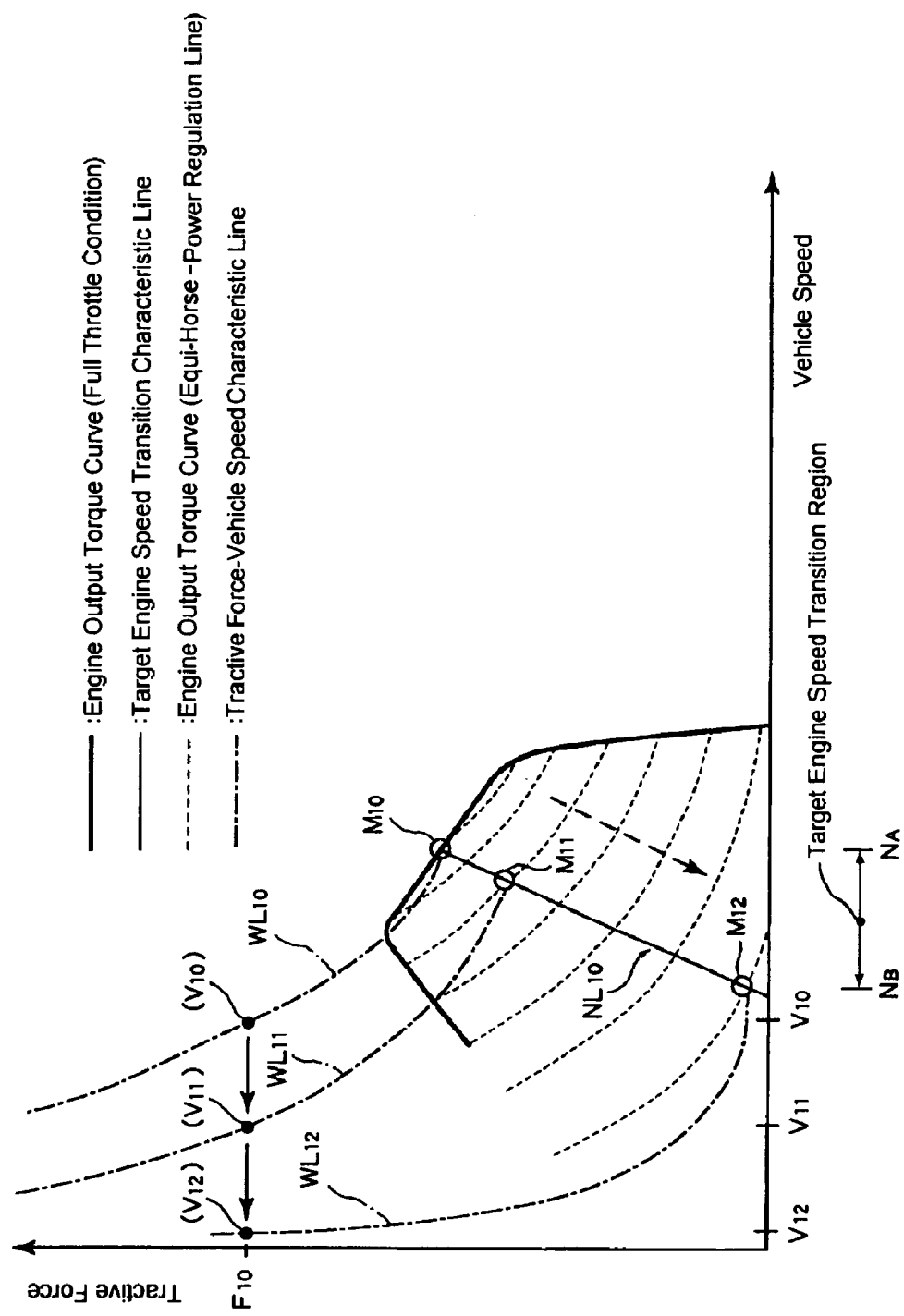
FIG. 9 is a tractive force/vehicle speed characteristic graph for explaining deceleration in an input-split region.

When the transmission 1 works as an input-split type transmission, the target engine speed control map (C) shown in FIG. 3(c) is selected. By use of this engine speed control map (C), the target engine speed transition characteristic line indicated by $NL_{10}$ in FIG. 9 is set. In conjunction with operation of the decelerator pedal 61 in which the decelerator pedal 61 is pressed until its operating amount reaches 90% of the entire stroke, the aforesaid matching point (indicated by white circle in FIG. 9) moves along the target engine speed transition characteristic line $NL_{10}$ from the point $M_{10}$ to the point $M_{12}$ through the point $M_{11}$. This is followed by the transition from the tractive force—vehicle speed characteristic line $WL_{10}$ which extends from the matching point $M_{10}$ as the input-split region to the tractive force—vehicle speed characteristic line $WL_{12}$ which extends from the matching point $M_{12}$ as the input-split region by way of the tractive force—vehicle speed characteristic line $WL_{11}$. Then, the balancing point (indicated by black circle in FIG. 9) between the tractive force $F_{10}$ required for the load and the tractive force—vehicle speed characteristic is shifted to the lower speed side, so that the vehicle speed drops from $V_{10}$ to $V_{11}$ and then to $V_{12}$.

[Deceleration from the Direct Region (See FIG. 10)]

Figure 10:
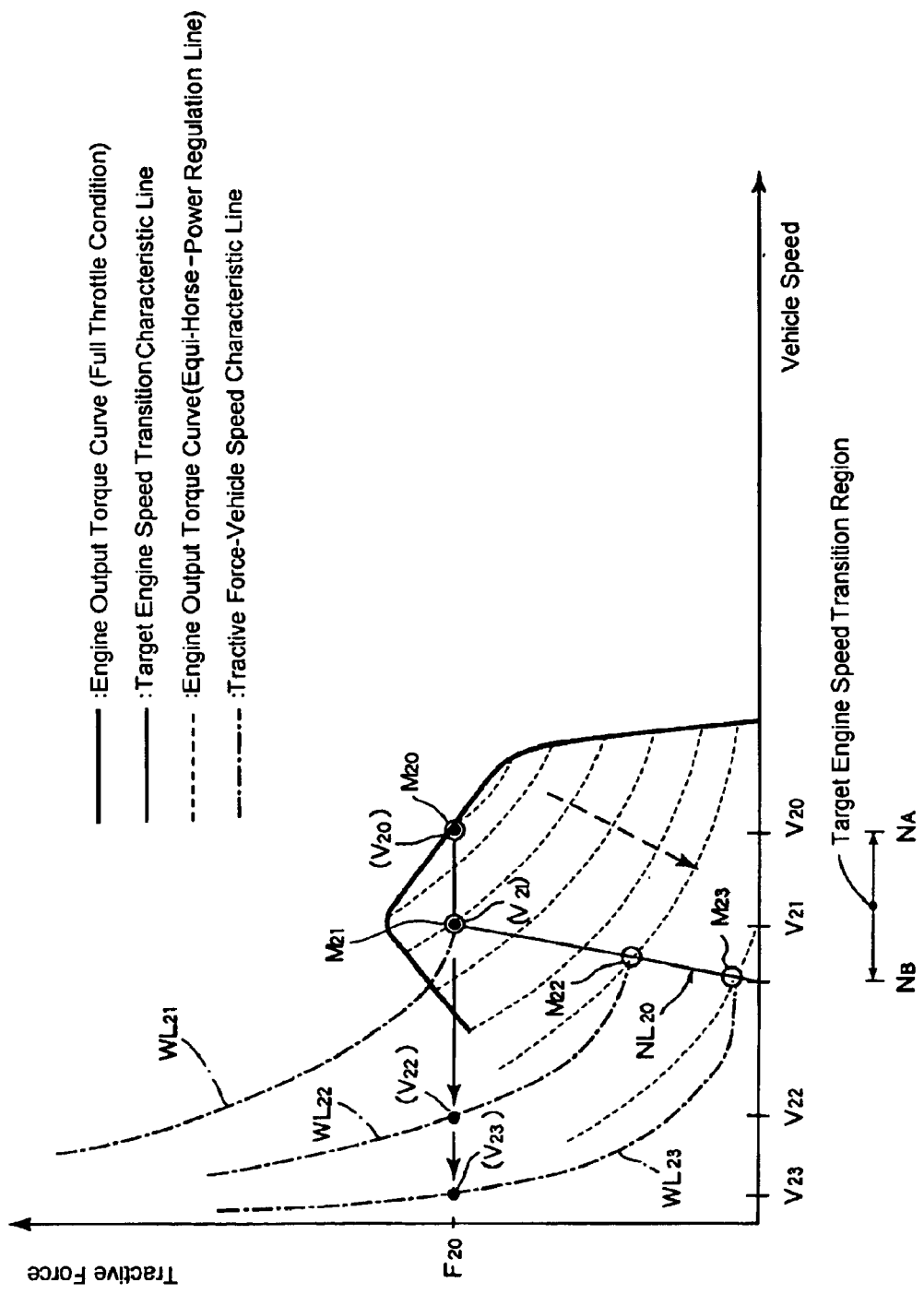
FIG. 10 is a tractive force/vehicle speed characteristic graph for explaining deceleration from a direct region.

When the transmission 1 works within the direct region, the target engine speed control map (B) shown in FIG. 3(b) is selected. By use of the target engine speed control map (B), the target engine speed transition characteristic line indicated by $NL_{20}$ in FIG. 10 is set. At this point, the switching valve 44 is controlled such that if the matching point exists between the point $M_{20}$ and the point $M_{21}$ on the target engine speed transition characteristic line $NL_{20}$, the direct region is selected and if the matching point exists between the point $M_2$, and the point $M_{23}$, the input-split region is selected. In conjunction with operation of the decelerator pedal 61 in which the decelerator pedal 61 is pressed until its operating amount reaches 90% of the entire stroke, the matching point (indicated by white circle in FIG. 10) moves along the target engine speed transition characteristic line $NL_{20}$ from the point $M_{20}$ to the point $M_{23}$ through the points $M_2$, and $M_{22}$. As the matching point moves along the target engine speed transition characteristic line $NL_{20}$ from the point $M_{20}$ to the point $M_{21}$, the engine output torque point matching the tractive force $F_{20}$ required for the load is shifted to the lower speed side by the above-described engine control so that the vehicle speed decreases from $V_{20}$ to $V_{21}$. The movement of the matching point from the point $M_{21}$ to the point $M_{23}$ on the target engine speed transition characteristic line $NL_{20}$ is followed by the transition from the tractive force—vehicle speed characteristic line $WL_{21}$ which extends from the matching point $M_2$, as the input-split region to the tractive force—vehicle speed characteristic line $WL_{23}$ which extends from the matching point $M_{23}$ as the input-split region by way of the tractive force—vehicle speed characteristic line indicated by $WL_{22}$ in FIG. 10. As a result, the balancing point (indicated by black circle in FIG. 10) between the tractive force $F_{20}$ required for the load and the tractive force—vehicle speed characteristic is shifted to the lower speed side, so that the vehicle speed drops from $V_{21}$ to $V_{22}$ and then to $V_{23}$.

[Deceleration from the Output-Split Region (See FIG. 11)]

Figure 11:
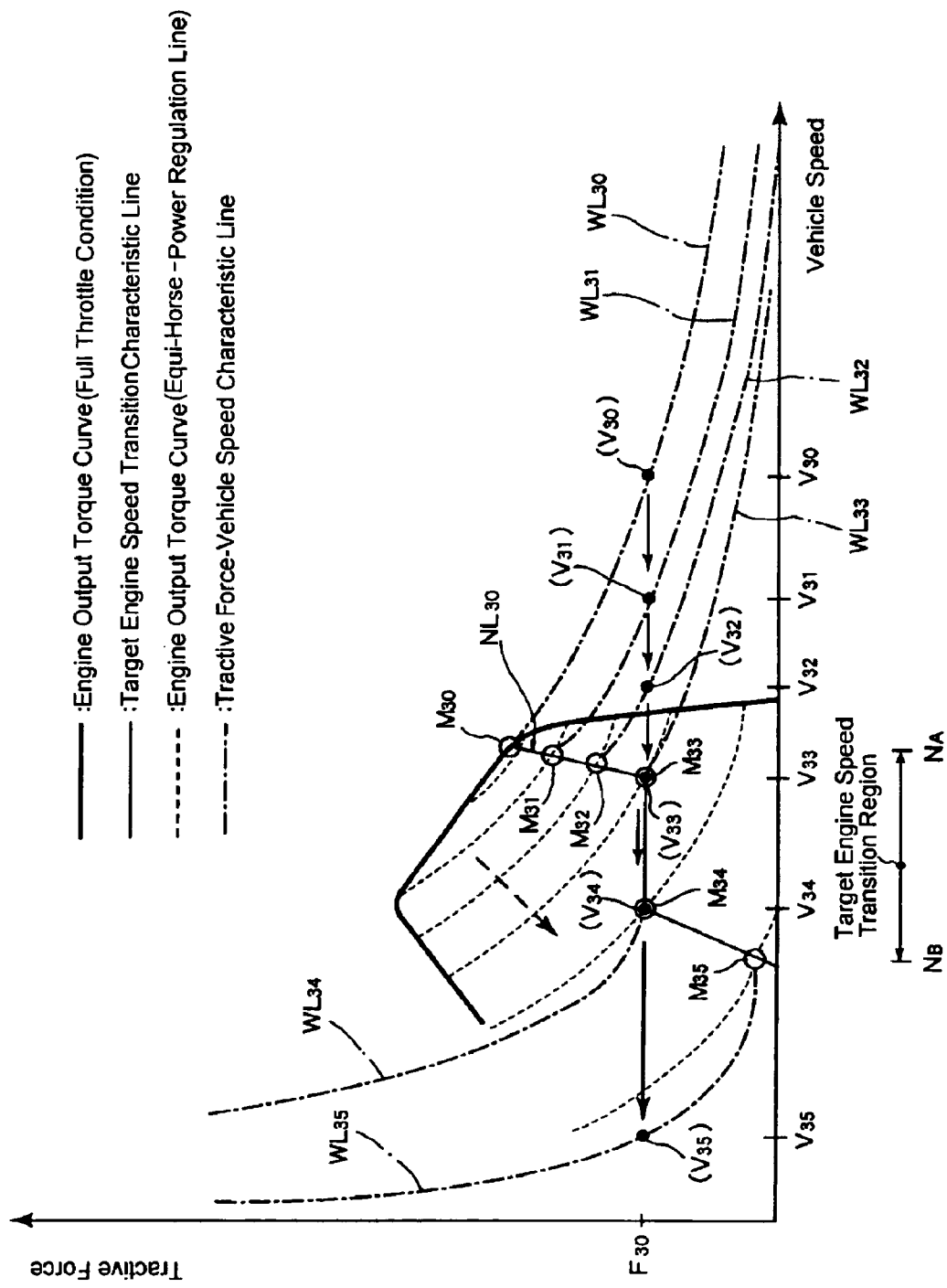
FIG. 11 is a tractive force/vehicle speed characteristic graph for explaining deceleration from an output-split region.
Figure 12:
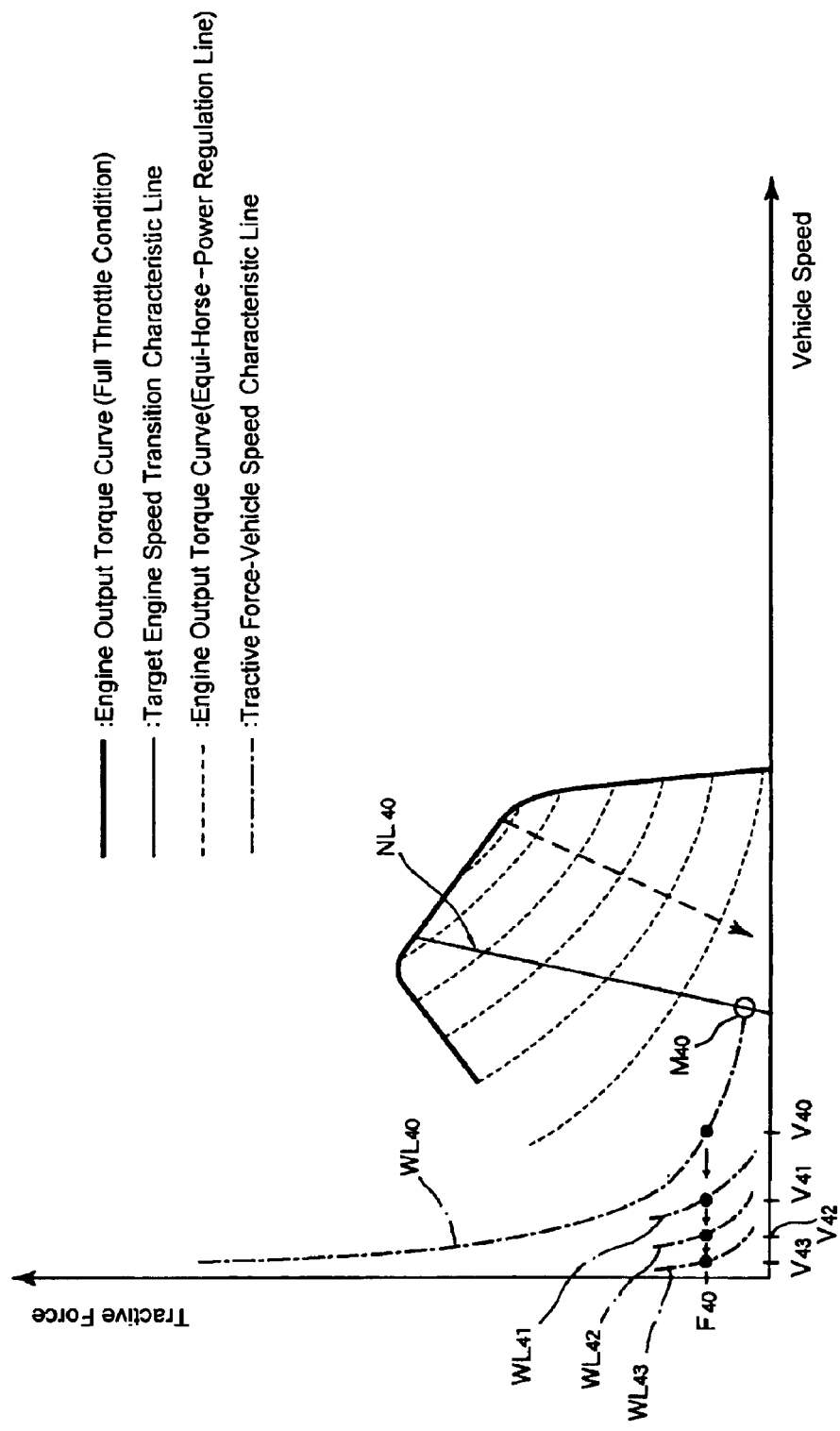
FIG. 12 is a tractive force/vehicle speed characteristic graph for explaining low-speed control in the input-split region.

When the transmission 1 works in the output-split region, the target engine speed control map (A) shown in FIG. 3(a) is selected. By use of this engine speed control map (A), the target engine speed transition characteristic line indicated by $NL_{30}$ in FIG. 11 is set. At this point, the switching valve 44 is controlled such that if the matching point exists between the point $M_{30}$ and the point $M_{33}$ on the target engine speed transition characteristic line $NL_{30}$, the output-split region is selected, if the matching point exists between the point $M_{33}$ and the point $M_{34}$, the direct region is selected, and if the matching point exists between the point $M_{34}$ and the point $M_{35}$, the input-split region is selected. In conjunction with operation of the decelerator pedal 61 in which the decelerator pedal 61 is pressed until its operating amount reaches 90% of the entire stroke, the matching point (indicated by while circle in FIG. 11) moves along the target engine speed transition characteristic line $NL_{30}$ from the point $M_{30}$ to the point $M_{35}$ through the points $M_{33}$ and $M_{34}$. The movement of the matching point from the point $M_{30}$ to the point $M_{33}$ on the target engine speed transition characteristic line $NL_{30}$ is followed by the transition from the tractive force—vehicle speed characteristic line $WL_{30}$ which extends from the matching point $M_{30}$ as the output-split region to the tractive force—vehicle speed characteristic line $WL_{33}$ which extends from the matching point $M_{33}$ as the output-split region by way of the tractive force—vehicle speed characteristic lines indicated by $WL_{31}$ and $WL_{32}$ in FIG. 11. As a result, the balancing point (indicated by black circle in FIG. 11) between the tractive force $F_{30}$ required for the load and the tractive force—vehicle speed characteristic is shifted to the lower speed side, so that the vehicle speed drops from $V_{30}$ to $V_{33}$ through $V_{31}$ and $V_{32}$. As the matching point moves along the target engine speed transition characteristic line $NL_{30}$ from the point $M_{33}$ to the point $M_{34}$, the engine output torque point matching the tractive force $F_{30}$ required for the load is shifted to the lower speed side by the above-described engine control, so that the vehicle speed drops from $V_{33}$ to $V_{34}$. The movement of the matching point from the point $M_{34}$ to the point $M_{35}$ on the target engine speed transition characteristic line $NL_{30}$ is followed by the transition from the tractive force—vehicle speed characteristic line $WL_{34}$ which extends from the matching point $M_{34}$ as the input-split region to the tractive force—vehicle speed characteristic line $WL_{35}$ which extends from the matching point $M_{35}$ as the input-split region. As a result, the balancing point (indicated by black circle in FIG. 11) between the tractive force $F_{30}$ required for the load and the tractive force—vehicle speed characteristic is shifted to the lower speed side, so that the vehicle speed drops from $V_{34}$ to $V_{35}$. Thus, the vehicle speed is decreased from $V_{30}$ to $V_{35}$ by shifting the matching point from the point $M_{30}$ to the point $M_{35}$ on the target engine speed transition characteristic line $NL_{30}$.

[Low Speed Control within the Input-Split Region (See FIG. 12)]

If the decelerator pedal 61 is further pressed when the tractive force required for the load is at an extremely low level on condition that the operating amount of the decelerator pedal 61 has reached 90% of the entire stroke and the tractive force—vehicle speed characteristic line $WL_{40}$ extending from the point $M_{40}$ on the target engine speed transition characteristic line $NL_{40}$ has been set as the input-split region, the controller 40 outputs an angle control signal to the servo mechanisms 42, 43 to reduce the speed ratio of the transmission 1 according to the pressing amount of the decelerator pedal 61. Accordingly, the speed ratio of the transmission 1 is forcibly reduced and, based on the pressing amount, a tractive force—vehicle speed characteristic line such as indicated by $WL_{41}$ to $WL_{43}$ is set. As a result, the balancing point between the tractive force $F_{40}$ required for the load and the tractive force—vehicle speed characteristic (indicated by black circle in FIG. 12) is further shifted to the lower speed side so that the vehicle speed is reduced from $V_{40}$ to $V_{43}$ through $V_{41}$ and $V_{42}$.

According to the first embodiment, since vehicle speed and engine speed can be reduced at the same time by operating the decelerator 60 as described earlier, the operator does not feel operational disorder, unlike the prior art. In addition, since tractive force—vehicle speed characteristics, which cover the low load—high speed region, low load—low speed region and high load—low speed region of the tractive force/vehicle speed characteristic graph, can be obtained by controlling setting of the target engine speed transition characteristic lines $NL_{10}$, $NL_{20}$, $NL_{30}$ and $NL_{40}$. This leads to improvements in the degree of freedom of the vehicle speed control.

In the first embodiment, it is possible to achieve reduction in wasteful fuel consumption and therefore further fuel cost reduction by controlling the target engine speed transition characteristic line NL such that the second target value $N_b$ mentioned in the above description of the fundamental principle of the tractive force—vehicle speed characteristic control (see FIG. 6) is set to or substantially set to such a value that provides a minimum fuel cost when the actual speed of the engine 2 becomes coincident with it.

Additionally, since the vehicle control system of the first embodiment has the transmission 1 capable of allowing hydraulic power to constantly flow in a forward direction, it does not suffer from great horsepower loss caused by a flow of power in a reverse direction as seen in the conventional input-split type and output-split type HMTs, so that improved power efficiency can be achieved and, moreover, torque shortage can be prevented, resulting in improved operability.

(Second Embodiment)

Figure 13:
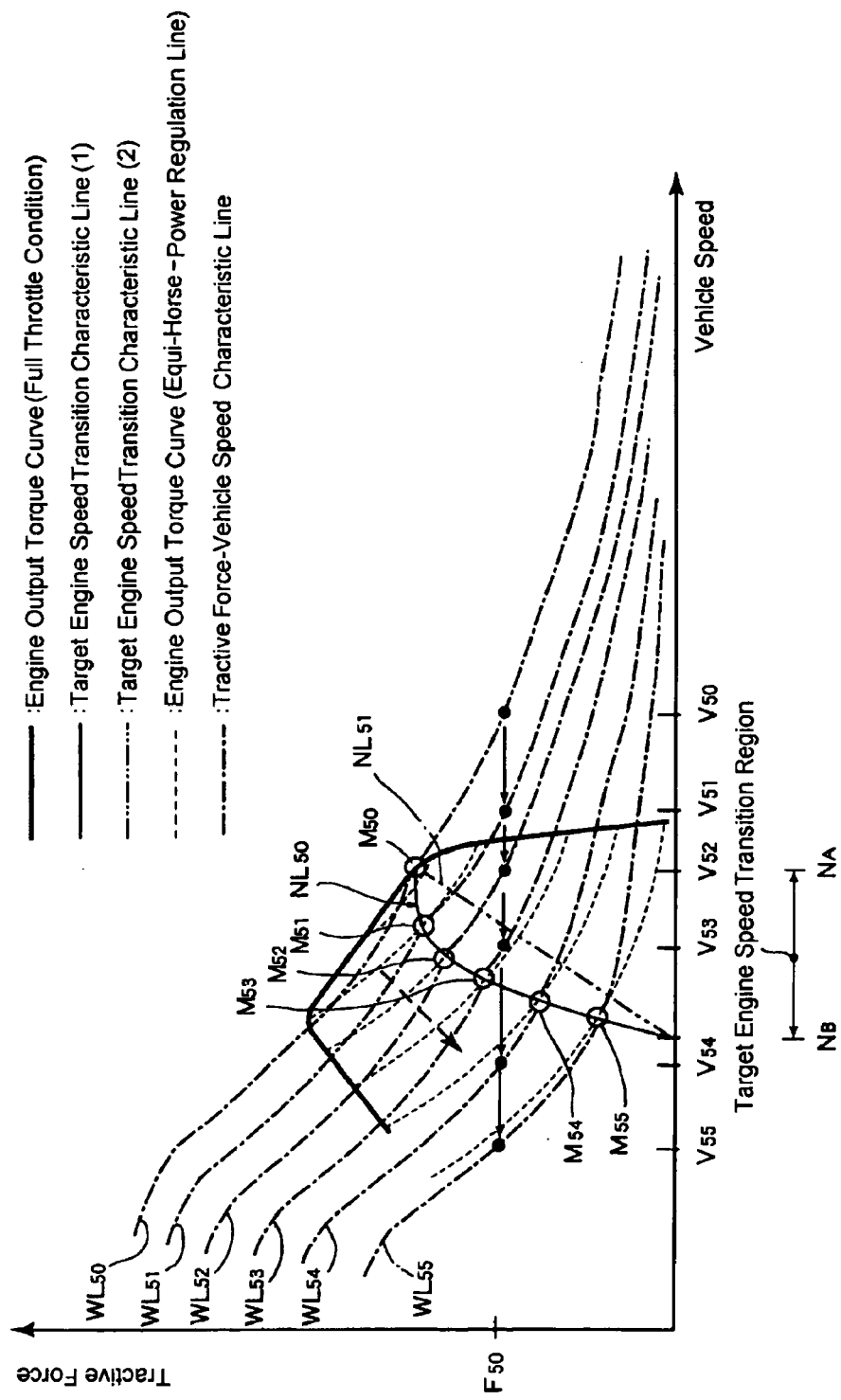
FIG. 13 is a tractive force/vehicle speed characteristic graph of a vehicle control system according to a second embodiment of the invention.
Figure 14:
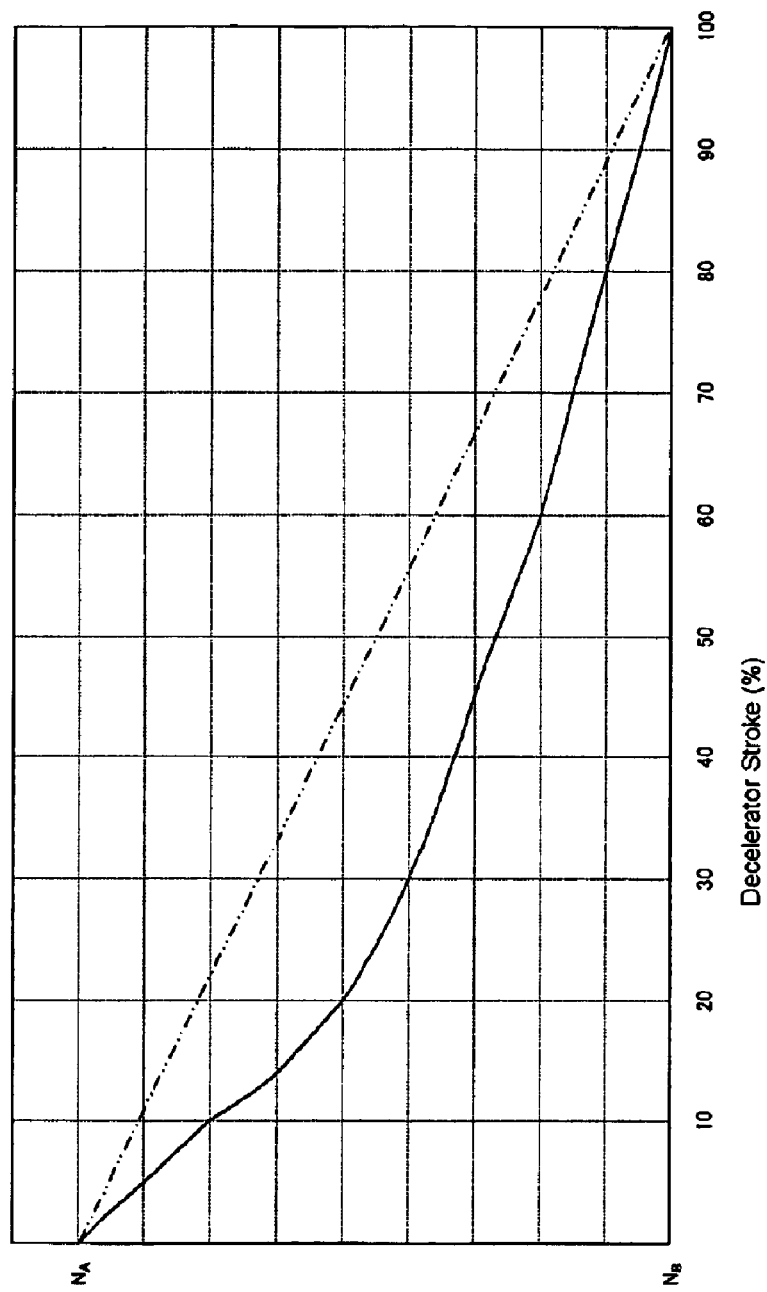
FIG. 14 is a target engine speed control map according to the second embodiment.

FIG. 13 shows a tractive force/vehicle speed characteristic graph of a vehicle control system according to a second embodiment of the invention. FIG. 14 shows a target engine speed control map according to the second embodiment. The second embodiment is associated with a case where the conventional output-split type HMT 100 is used in place of the transmission 1 of the first embodiment. The fundamental principle of the tractive force—vehicle speed characteristic control described earlier is also applied to the second embodiment.

In the second embodiment, the target engine speed control map indicated by solid line in FIG. 14 is used according to which, the target engine speed transition characteristic line indicated by $NL_{50}$ in FIG. 13 is set. In conjunction with operation of the decelerator pedal 61 in which the decelerator pedal 61 is pressed until its operating amount reaches 100% of the entire stroke, the matching point (indicated by white circles in FIG. 13) moves along the target engine speed transition characteristic line $NL_{50}$ from the point $M_{50}$ to the terminal point by way of the points $M_{51}$, $M_{52}$, $M_{53}$, $M_{54}$ and $M_{55}$. As a result, the tractive force—vehicle speed characteristic line transitions with the sequence $WL_{50}$ →$WL_{51}$ →$WL_{52}$ →$WL_{53}$ →$WL_{54}$→$WL_{55}$. Then, the balancing point (indicated by black circles in FIG. 13) between the tractive force $F_{50}$ required for the load and the tractive force—vehicle speed characteristic is shifted to the lower speed side, so that the vehicle speed drops with the sequence $V_{50}$→$V_{51}$→$V_{52}$→$V_{53}$→$V_{54}$→$V_{55}$. Accordingly, vehicle speed and engine speed can be decreased at the same time through operation of the decelerator 60, similarly to the first embodiment, so that the operator does not feel operational disorder such as seen in the prior art.

For the purpose of achieving reduction in wasteful fuel consumption and therefore further fuel cost reduction, the target engine speed transition characteristic line $NL_{50}$ is set such that the second target value $N_b$ mentioned in the above description of the fundamental principle of the tractive force—vehicle speed characteristic control (see FIG. 6) is set or substantially set to such a value that provides a minimum fuel cost when the actual speed of the engine 2 becomes coincident with it.

By replacing the target engine speed control map indicated by solid line in FIG. 14 with the target engine speed control map indicated by chain double-dashed line in FIG. 14, it becomes possible to set a linear target engine speed transition characteristic line such as indicated by $NL_{51}$ in FIG. 13. This leads to an improvement in the responsibility of the deceleration performed by the decelerator 60.

What is claimed is:

1. A vehicle control system which has an engine and a hydro-mechanical transmission formed such that power from the engine is transmitted from an input shaft to an output shaft through a mechanical transmission unit and a hydrostatic transmission unit, the vehicle control system comprising:

(a) target engine speed altering means for changing, according to an operating amount, a target engine speed set as a target value for the actual speed of the engine;

(b) target speed ratio calculating means for calculating a target value for the speed ratio of the hydro-mechanical transmission which target value makes the actual speed of the engine coincident with the target engine speed;

(c) hydrostatic transmission unit controlling means for controlling the hydrostatic transmission unit so as to make the actual speed ratio of the hydro-mechanical transmission coincident with the target speed ratio calculated by the target speed ratio calculating means; and (d) engine controlling means for controlling the engine such that if the target engine speed is changed from a first target value to a second target value lower than the first target value by the target engine speed altering means, the output torque of the engine is reduced, while keeping the ratio of the amount of change in the output torque of the engine to the amount of change in the target engine speed constant or substantially constant.

2. The vehicle control system according to claim 1, wherein the engine controlling means controls the engine such that the engine output torque characteristic when the actual speed of the engine is made coincident with the second target value becomes an engine output torque characteristic which allows the output of the engine to vary constantly or substantially constantly.

3. The vehicle control system according to claim 1, wherein the mechanical transmission unit is a planetary gear train interposed between the input shaft and the output shaft, and the hydrostatic transmission unit includes a first pump/motor and a second pump/motor connected to the first pump/motor;

wherein the input shaft is coupled to a first element of the planetary gear train, the second pump/motor is coupled to a second element of the planetary gear train, and the output shaft is coupled to a third element of the planetary gear train; and which further comprises a clutch mechanism for selectively coupling the first pump/motor to either the input shaft or output shaft.

4. The vehicle control system according to claim 3, wherein the engine controlling means controls the engine such that the engine output torque characteristic when the actual speed of the engine is made coincident with the second target value becomes an engine output torque characteristic which allows the output of the engine to vary constantly or substantially constantly.

5. The vehicle control system according to claim 1, wherein the second target value is set to an engine speed value which provides a minimum fuel cost in an engine running condition where the actual speed of the engine is coincident with the second target value or set to a value approximate to said engine speed value.

6. The vehicle control system according to claim 2, wherein the second target value is set to an engine speed value which provides a minimum fuel cost in an engine running condition where the actual speed of the engine is coincident with the second target value or set to a value approximate to said engine speed value.

7. The vehicle control system according to claim 3, wherein the second target value is set to an engine speed value which provides a minimum fuel cost in an engine running condition where the actual speed of the engine is coincident with the second target value or set to a value approximate to said engine speed value.

8. The vehicle control system according to claim 4, wherein the second target value is set to an engine speed value which provides a minimum fuel cost in an engine running condition where the actual speed of the engine is coincident with the second target value or set to a value approximate to said engine speed value.

* * * * *